(12) United States Patent
Yasui et al.

(10) Patent No.: US 6,941,213 B2
(45) Date of Patent: Sep. 6, 2005

(54) ROAD CONDITION ESTIMATION APPARATUS

(75) Inventors: Yoshiyuki Yasui, Nagoya (JP); Eiichi Ono, Toyota (JP); Yuji Muragishi, Nagoya (JP); Shinji Takeuchi, Okazaki (JP); Minekazu Momiyama, Chiryu (JP); Hiroaki Kato, Hekinan (JP); Yuzo Imoto, Chita-gun (JP); Hiroaki Aizawa, Anjo (JP)

(73) Assignees: Aisin Seiki Kabushiki Kaisha, Kariya (JP); Toyoda Koki Kabushiki Kaisha, Kariya (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 10/682,405

(22) Filed: Oct. 10, 2003

(65) Prior Publication Data

US 2004/0133324 A1 Jul. 8, 2004

(30) Foreign Application Priority Data

Oct. 11, 2002 (JP) ........................................ 2002-298358

(51) Int. Cl.$^7$ ............................................. G06F 19/00
(52) U.S. Cl. ............................... 701/80; 701/41; 73/105
(58) Field of Search ............................... 701/41–44, 73, 701/80; 180/443, 446; 73/104–105

(56) References Cited

U.S. PATENT DOCUMENTS

| 4,794,539 | A |   | 12/1988 | Wallentowitz et al. |
|---|---|---|---|---|
| 5,058,018 | A | * | 10/1991 | Kuwana et al. ............... 701/73 |
| 5,263,548 | A | * | 11/1993 | Tsuyama et al. ............ 180/197 |
| 5,286,098 | A | * | 2/1994 | Okubo ....................... 303/148 |
| 6,184,637 | B1 |   | 2/2001 | Yamawaki et al. |
| 6,349,789 | B1 |   | 2/2002 | Nakano et al. |
| 6,453,226 | B1 | * | 9/2002 | Hac et al. ..................... 701/48 |
| 6,678,596 | B2 | * | 1/2004 | Husain et al. ................ 701/41 |
| 6,782,968 | B2 | * | 8/2004 | Sakugawa .................... 180/446 |
| 2001/0003810 | A1 |   | 6/2001 | Shinmura et al. |
| 2002/0011093 | A1 |   | 1/2002 | Matsuno |
| 2003/0028308 | A1 | * | 2/2003 | Ishikawa et al. .............. 701/71 |
| 2004/0019417 | A1 |   | 1/2004 | Yasui et al. |
| 2004/0019423 | A1 | * | 1/2004 | Yasui et al. ................... 701/71 |
| 2004/0148077 | A1 | * | 7/2004 | Yasui et al. ................... 701/41 |

FOREIGN PATENT DOCUMENTS

DE 39 22 518 C1 7/1990
EP 0 323 066 A2 7/1989

(Continued)

OTHER PUBLICATIONS

Automotive Engineering Handbook, First Volumne, *Basic & Theory*, Society of Automotive Engineers of Japan, Inc., Feb. 1, 1990, pp. 179–180.

*Primary Examiner*—Gary Chin
(74) *Attorney, Agent, or Firm*—Burns, Doane, Swecker & Mathis, LLP

(57) ABSTRACT

The present invention is directed to a road condition estimation apparatus for estimating a road condition for use in a vehicle having steering control unit for actuating a device mechanically independent of a manually operated steering member to steer each wheel. The apparatus includes a reaction torque detection unit for detecting reaction torque for detecting a reaction torque when at least a wheel of the vehicle is steered by the steering control unit, an aligning torque estimation unit for estimating an aligning torque produced on the wheel on the basis of the reaction torque detected by the reaction torque detection unit, a wheel factor providing unit for providing at least one of wheel factors including a side force and a slip angle applied to the wheel, and a grip factor estimation unit for estimating a grip factor of at least a tire of the wheel, in accordance with a relationship between the aligning torque estimated by the aligning torque estimation unit and the wheel factor estimated by the wheel factor providing unit.

18 Claims, 27 Drawing Sheets

FOREIGN PATENT DOCUMENTS

| | | |
|---|---|---|
| EP | 0 470 700 A2 | 2/1992 |
| EP | 0 716 948 A2 | 6/1996 |
| JP | 62-146754 A | 6/1987 |
| JP | 6-99800 A | 4/1994 |
| JP | 7-329808 A | 12/1995 |
| JP | 2716435 B2 | 11/1997 |
| JP | 11-99956 A | 4/1999 |
| JP | 2001-191937 A | 7/2001 |

* cited by examiner

FIG. 38

| EMBODIMENT | FACTOR TO BE DETECTED | | |
|---|---|---|---|
| | ALIGNING TORQUE | WHEEL FACTOR | |
| a | ESTIMATED BY OUTPUT OF STEERING ACTUATOR | SIDE FORCE | ESTIMATED BY VEHICLE STATE VARIABLE |
| b | ESTIMATED BY OUTPUT OF STEERING ACTUATOR | WHEEL SLIP ANGLE | ESTIMATED BY VEHICLE STATE VARIABLE |
| c | TORQUE SENSOR | SIDE FORCE | SIDE FORCE SENSOR |
| d | TORQUE SENSOR | WHEEL SLIP ANGLE | SLIP ANGLE SENSOR |
| e | TORQUE SENSOR | SIDE FORCE | ESTIMATED BY VEHICLE STATE VARIABLE |
| f | TORQUE SENSOR | WHEEL SLIP ANGLE | ESTIMATED BY VEHICLE STATE VARIABLE |
| g | ESTIMATED BY OUTPUT OF STEERING ACTUATOR | SIDE FORCE | SIDE FORCE SENSOR |
| h | ESTIMATED BY OUTPUT OF STEERING ACTUATOR | WHEEL SLIP ANGLE | SLIP ANGLE SENSOR |

ROAD CONDITION ESTIMATION APPARATUS

This application claims priority under 35 U.S.C. Sec. 119 to No.2002-298358 filed in Japan on Oct. 11, 2002, the entire content of which is herein incorporated by reference.

BACKGROUND OF THE INVENTION

1. Field of the Invention

The present invention relates to a road condition estimation apparatus, particularly relates to an apparatus for estimating a grip factor indicative of a grip level of tire on a road surface in a lateral direction of a vehicle wheel, and/or estimating a coefficient of friction of each wheel to a road surface on the basis of the grip factor, to estimate a road condition on the basis of at least one of road factors including the grip factor and the coefficient of friction.

2. Description of the Related Arts

In order to maintain a stability of a vehicle, there is known heretofore an apparatus for controlling a braking force applied to each wheel on the basis of vehicle state variable detected and determined, as disclosed in Japanese Patent Laid-open Publication No.6-99800, for example. In this publication, a target value of yaw rate is provided on the basis of a vehicle speed and a steering angle, and an over steering or an under steering is determined by a derived function of a difference between the actual value and the target value of the yaw rate. In case of the over steering, a braking slip is increased on a front wheel located outside of a curve when cornering, i.e., a braking force is increased on the front wheel located outside of the curve. Whereas, in case of the under steering, the braking slip is increased on the front wheel located inside of the curve. And, there is disclosed in Japanese Patent Laid-open Publication No.62-146754, an apparatus for setting a front wheel speed difference and a target value of lateral acceleration or yaw rate, on the basis of a steering angle and a vehicle speed, to control a brake and/or an output of an engine.

In Japanese Patent Laid-open Publication No.11-99956, there is disclosed a steering apparatus for a vehicle with a variable steering angle ratio, to prevent wheels from being steered excessively, wherein an index named as a side force utilization ratio or lateral G utilization ratio is used. According to the apparatus as disclosed in the publication, a road coefficient of friction $\mu$ is estimated, to provide the side force utilization ratio. It is described that reaction force of a rack axis with the same steering angle applied by a road surface will be reduced in accordance with the road coefficient of friction $\mu$, because the lower the road coefficient of friction $\mu$ is, the more a cornering power Cp of tire will be reduced. Therefore, it is concluded that the road coefficient of friction $\mu$ can be estimated by measuring the steering angle of front wheels and the reaction force of the rack axis, and comparing the reaction force of the rack axis against the steering angle of front wheels and a reference reaction force of the rack axis which is provided in advance as an inside model. Moreover, an equivalent friction circle is provided on the basis of the road coefficient of friction $\mu$, then an amount of friction force used by a longitudinal force is subtracted from it to provide a maximal side force to be produced, and a ratio of the presently produced side force and the maximal side force is set as the side force utilization ratio. Or, a lateral G sensor may be provided for setting the lateral G utilization ratio on the basis of the lateral G detected by the sensor.

Recent progress in electronics engineering has brought a so-called "by-wire system" into various manipulation systems for vehicles, such as a steer-by-wire system for use in a steering control system. For example, in Japanese Patent Laid-open Publication No.2001-191937, there is disclosed the steer-by-wire system, wherein a steering angle is controlled in response to movement of a steering actuator operated by a manually operated steering member, e.g., steering wheel, which is not mechanically connected with wheels, and a steering control apparatus for vehicles has been proposed as an improvement of the system. Also, in Japanese Patent Laid-open Publication No.7-329808, there is disclosed a steering control apparatus for controlling a steering angle for rear wheels by means of a motor, which may be included in the field of the steer-by-wire system.

In view of improvement of the vehicle stability, a vehicle speed control apparatus for controlling a speed of a vehicle under cornering operation has been proposed in Japanese Patent No.2716435. It is disclosed in this Patent that lateral forces (SV, SH) are detected, and vehicle slip angles ($\delta$V, $\delta$H) are detected as driving characteristics of the vehicle under cornering operation, and that quotients ($\Delta$SV/$\Delta\delta$V, $\Delta$SH/$\Delta\delta$H) of the variations of the lateral forces ($\Delta$SV, $\Delta$SH) and the variations of the lateral forces ($\Delta\delta$V, $\Delta\delta$H) are compared with a predetermined limit (K), so that the vehicle speed is controlled, when the quotients exceed the predetermined limit (K).

In the case where friction between a road surface and a vehicle tire has come to its limit, to cause an excessive under steering condition, it is required not only to control a yawing motion of the vehicle, i.e., a position of the vehicle on the road surface, but also to reduce the vehicle speed, in order to maintain a radius of cornering curve of the vehicle as intended by the vehicle driver. According to the apparatus as disclosed in the Publication No.6-99800, however, the vehicle behavior is determined after the tire reached the friction limit. When the vehicle speed is reduced in that situation, therefore, the cornering force will be reduced, whereby the tendency of under steering might be increased. Furthermore, according to the actual control system, as there is provided a dead zone for a control, the control generally begins after a certain vehicle behavior occurred.

As the curve of a vehicle road is formed into a clothoid curve, when the vehicle driver intends to trace the curve of the road, the steering wheel will be rotated with a gradually increasing amount. In the case where the vehicle speed is high when the vehicle has entered into the curve, therefore, the side force produced on the wheel will not balance with a centrifugal force, whereby the vehicle tends to be forced outside of the curve. In those cases, the apparatuses as disclosed in the Publication No.6-99800 and 62-146754 will operate to control the motion of the vehicle. However, as the controls begin at the cornering limit, the vehicle speed may not be reduced sufficiently by those controls. Therefore, it might be caused that the vehicle can not be prevented only by those controls from being forced outside of the curve.

According to the apparatus as disclosed in Japanese Patent No.2716435, the vehicle is controlled on the basis of the variation of lateral force and the variation of vehicle slip angle. As those variations (i.e., time derivative value) are likely affected by noise, detection accuracy is to be watched, in the case where disturbance given from the road surface is large when the vehicle is running on a rough road, for example. As the vehicle is controlled on the basis of the variation of lateral force and the variation of vehicle slip angle according to that apparatus, start of the control can be determined only in such a state that the characteristic of [wheel slip angle to lateral force], or [wheel slip angle to side force] begins to be saturated, i.e., in the vicinity of its limit, even in a normal state.

Furthermore, it is disclosed in AUTOMOTIVE ENGINEERING HANDBOOK, First Volume, for BASIC & THEORY, issued on Feb. 1st, 1990 by Society of Automotive Engineers of Japan, Inc., Pages 179 and 180, such a state that a tire rotates on a road, skidding at a slip angle α, as shown in a part of FIG. 1 of the present application. As indicated by broken lines in FIG. 1, a tread surface of the tire contacts a road surface at a front end of the contacting surface including Point (A) in FIG. 1, and moves with the tire advanced, being adhesive to the road surface up to Point (B). The tire begins to slip when a deformation force by a lateral shearing deformation has become equal to a friction force, and departs from the road surface at a rear end including Point (C). In this case, a side force Fy produced on the overall contacting surface equals to a product of a deformed area of the tread in its lateral direction (as indicated by a hutching area in FIG. 1) multiplied by its lateral elastic coefficient per unit area. As shown in FIG. 2, a point of application of force for the side force Fy is shifted rearward (leftward in FIG. 1) from a point (O) on the center line of the tire, by a distance ($e_n$) which is called as a pneumatic trail. Accordingly, a moment Fy·$e_n$ becomes an aligning torque (Tsa), which acts in such a direction to reduce the slip angle α, and which may be called as a self-aligning torque.

Next will be explained the case where the tire is installed on a vehicle, with reference to FIG. 2 which simplified FIG. 1. With respect to steered wheels of a vehicle, in general, a caster angle is provided so that a steering wheel can be returned to its original position smoothly, to produce a caster trail ($e_c$). Therefore, the tire contacts the road surface at a point (O'), so that the moment for forcing the steering wheel to be positioned on its original position becomes Fy·($e_n$+$e_c$). When a lateral grip force of the tire is reduced to enlarge the slip area, the lateral deformation of the tread will result in changing a shape of ABC in FIG. 2 into a shape of ADC. As a result, the point of application of force for the side force Fy will be shifted forward in the advancing direction of the vehicle, from Point (H) to Point (J). That is, the pneumatic trail ($e_n$) will be reduced. Therefore, even in the case where the same side force Fy acts on the tire, if the adhesive area is relatively large and the slip area is relatively small, i.e., the lateral grip force of the tire is relatively large, the pneumatic trail ($e_n$) will be relatively large, so that the aligning torque Tsa will be relatively large. On the contrary, if the lateral grip force of the tire is lessened, and the slip area is enlarged, then the pneumatic trail ($e_n$) will become relatively small, so that the aligning torque Tsa will be reduced.

As described above, by monitoring the variation of the pneumatic trail ($e_n$), the grip level of the tire in its lateral direction can be detected. And, the variation of the pneumatic trail ($e_n$) results in the aligning torque Tsa, on the basis of which can be estimated a grip factor indicative of a grip level of the tire in its lateral direction, with respect to a front wheel for example (hereinafter simply referred to as grip factor). With respect to the grip factor, it can be estimated on the basis of a margin of side force for road friction, as described later in detail.

The grip factor as described above is clearly distinguished from the side force utilization ratio, or lateral G utilization ratio as described in the Publication No.11-99956, wherein the maximal side force which can be produced on the road surface is obtained on the basis of the road coefficient of friction $\mu$. And, this road coefficient of friction $\mu$ is estimated on the basis of a reliability of the cornering power Cp (value of the side force per the slip angle of one degree) on the road coefficient of friction $\mu$. However, the cornering power Cp relies not only on the road coefficient of friction $\mu$, but also a shape of the area of the road contacting the tire (its contacting length and width to the road), and elasticity of the tread rubber. For example, in the case where water exists on the tread surface, or the case where the elasticity of the tread rubber has been changed due to wear of the tire or its temperature change, the cornering power Cp will vary, even if the road coefficient of friction $\mu$ is constant. In the Publication No.11-99956, therefore, nothing has been considered about the characteristic of the tire which constitutes the wheel.

On the contrary, if the grip factor as described before is used directly for the various controls, they can be achieved appropriately in accordance with a road condition, at the early stage well before the friction between the road surface and the tire comes to its limit. In addition, the coefficient of friction of the road surface can be estimated on the basis of the grip factor, as will be described later in detail. Therefore, if the grip factor and the coefficient of friction are employed as the road factors, to estimate the road condition on the basis of the road factors, the road condition can be estimated at the early stage well before the friction between the road surface and the tire comes to its limit.

Especially when the steer-by-wire system as disclosed in the Publication Nos.2001-191937 and 7-329808 is employed, the steering control is made by actuating means (e.g., motor) which is separated mechanically from the steering wheel served as the manually operated steering member. In this case, therefore, the aligning torque as described before can be obtained by detecting a signal (e.g., electric current) for driving the actuating means, as will be described later in detail, so that the estimation of the grip factor can be made easily. Furthermore, if it is so constituted that the steering control can be performed for each wheel, the grip factor of each wheel can be estimated. Then, the grip factor can be watched from the normal state, and in such a state that the grip factor is reduced or likely to be reduced, the vehicle stability control can be achieved.

SUMMARY OF THE INVENTION

Accordingly, it is an object of the present invention to provide a road condition estimation apparatus for use in a vehicle with a steer-by-wire system which is adapted to control a steering angle of each wheel by an actuator separated mechanically from a manually operated steering member, and capable of accurately estimating a condition of a road surface for each wheel at an appropriate timing, when the vehicle is running on the road surface.

It is another object of the present invention to provide a vehicle motion control apparatus for use in a vehicle with a steer-by-wire system which is adapted to control a steering angle by an actuator separated mechanically from a manually operated steering member, and capable of accurately estimating a condition of a road surface for each wheel at an appropriate timing, when the vehicle is running on the road surface, and achieving a motion control appropriately on the basis of the estimated road condition.

In accomplishing the above and other objects, the road condition estimation apparatus is provided for estimating a road condition for use in a vehicle having steering control means for actuating a device mechanically independent of a manually operated steering member to steer each wheel. The apparatus includes reaction torque detection means for detecting a reaction torque when at least a wheel of the vehicle is steered by the steering control means, aligning torque estimation means for estimating an aligning torque produced on the wheel on the basis of the reaction torque detected by the reaction torque detection means, wheel factor providing means for providing at least one of wheel factors including a side force and a slip angle applied to the wheel, and grip factor estimation means for estimating a grip factor of at least a tire of the wheel, in accordance with a relationship between the aligning torque estimated by the aligning torque estimation means and the wheel factor provided by the wheel factor providing means.

In the steering control means as described above, the device may be constituted by a motor. The side force and slip angle applied to the wheel can be estimated by vehicle state variable detection means for detecting a vehicle state variable such as vehicle speed, lateral acceleration, yaw rate, steering angle and the like. Or, the side force and slip angle can be directly detected.

Preferably, the apparatus further includes friction estimation means for estimating a coefficient of friction of a road on which the vehicle is running, on the basis of the grip factor estimated by the grip factor estimation means.

Furthermore, the apparatus may include warning means for warning to a vehicle driver when at least one of road factors including the grip factor estimated by the grip factor estimation means and the coefficient of friction estimated by the friction estimation means is less than a predetermined value.

The apparatus may further include road surface determination means for determining whether the vehicle is running on a split road with at least two parallel lanes having different coefficients of friction, on the basis of the result of comparison between at least one of road factors including the grip factor estimated by the grip factor estimation means and the coefficient of friction estimated by the friction estimation means with respect to a right wheel of the vehicle, and at least one of the road factors with respect to a left wheel of the vehicle.

As for a vehicle motion control apparatus, it is preferably provided with an apparatus for estimating a road condition for use in a vehicle having steering control means for actuating a device mechanically independent of a manually operated steering member to steer each wheel. And, the vehicle motion control apparatus includes reaction torque detection means for detecting a reaction torque when at least a wheel of the vehicle is steered by the steering control means, aligning torque estimation means for estimating an aligning torque produced on the wheel on the basis of the reaction torque detected by the reaction torque detection means, wheel factor providing means for estimating at least one of wheel factors including a side force and a slip angle applied to the wheel, and grip factor estimation means for estimating a grip factor of at least a tire of the wheel, in accordance with a relationship between the aligning torque estimated by the aligning torque estimation means and the wheel factor provided by the wheel factor providing means. And, the steering control means is adapted to steer the wheel to provide a steering angle thereof on the basis of the grip factor estimated by the grip factor estimation means.

Preferably, the steering control means is adapted to steer one wheel of the vehicle with the grip factor reduced to be less than a predetermined value, to reduce the steering angle of the one wheel. And, the steering control means may be adapted to steer the other one wheel of the vehicle placed on a position opposite to the one wheel in a lateral direction of the vehicle, to increase the steering angle of the other one wheel.

Furthermore, the apparatus may include braking force control means for controlling a braking force applied to each wheel of the vehicle, and the braking force control means may set the braking force on the basis of the grip factor estimated by the grip factor estimation means.

In the case where the grip factor of one wheel of the vehicle estimated by the grip factor estimation means is reduced to be less than a predetermined value, the braking force control means may apply the braking force to wheels of the vehicle other than the one wheel. Or, in that case, the braking force control means may reduce the braking force applied to the one wheel, and increase the braking force applied to at least one of the wheels of the vehicle other than the one wheel.

BRIEF DESCRIPTION OF THE DRAWINGS

The above stated object and following description will become readily apparent with reference to the accompanying drawings, wherein like referenced numerals denote like elements, and in which:

FIG. 38 is a table showing embodiments with such systems as constituted to estimate a grip factor of each wheel independently and individually, according to the present invention.

DESCRIPTION OF THE PREFERRED EMBODIMENTS

Figure 1:
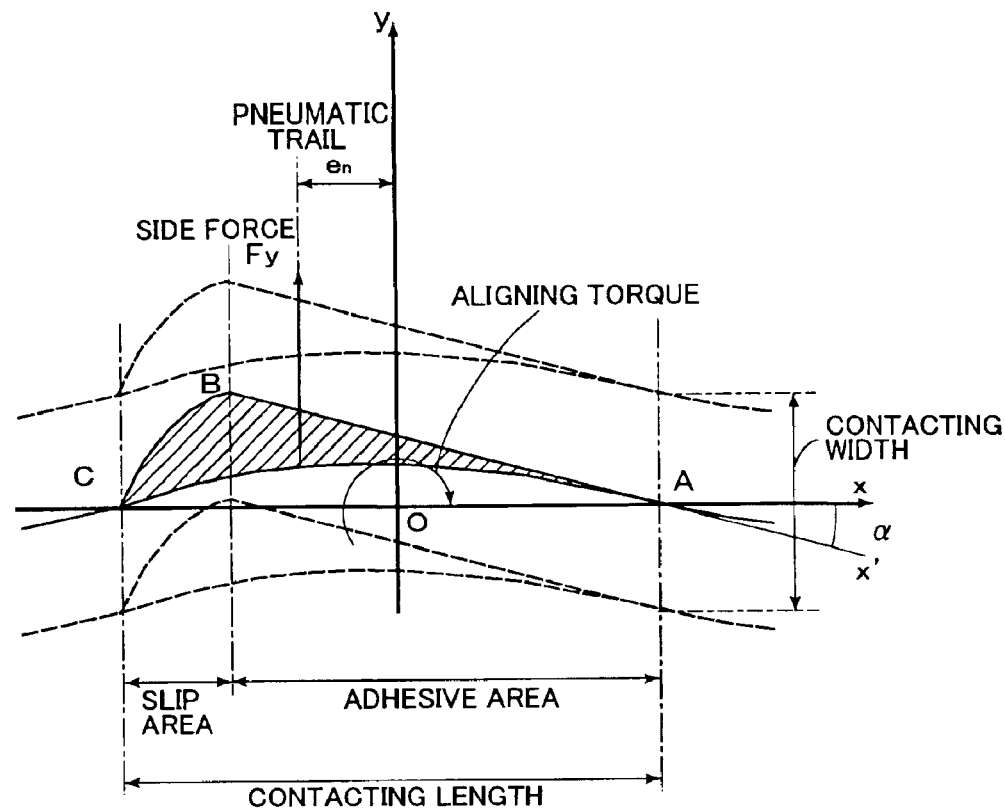
FIG. 1 is a diagram showing a relationship between aligning torque and side force, when a tire is advanced, skidding in a lateral direction.
Figure 2:
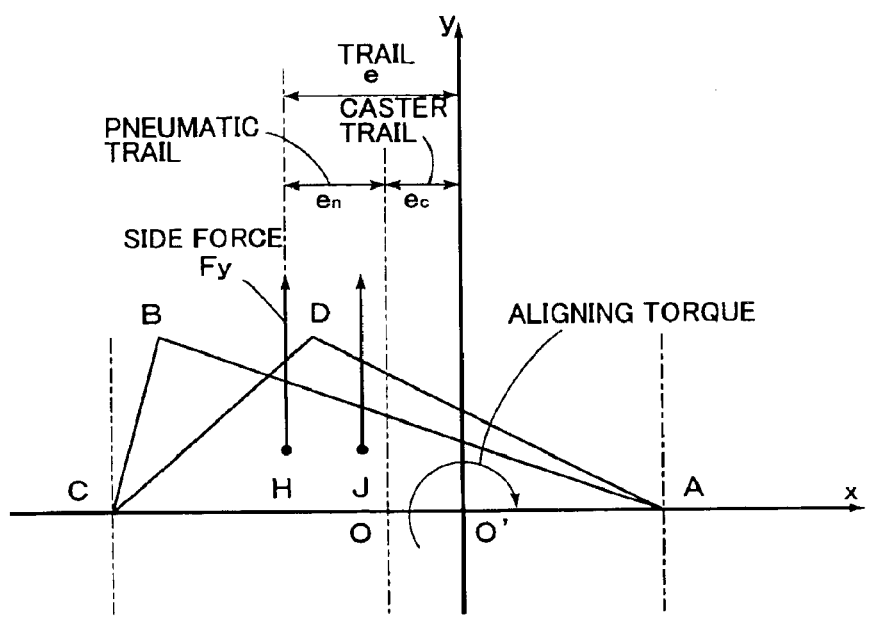
FIG. 2 is a diagram simplifying the relationship between aligning torque and side force as shown in FIG. 1.
Figure 3:
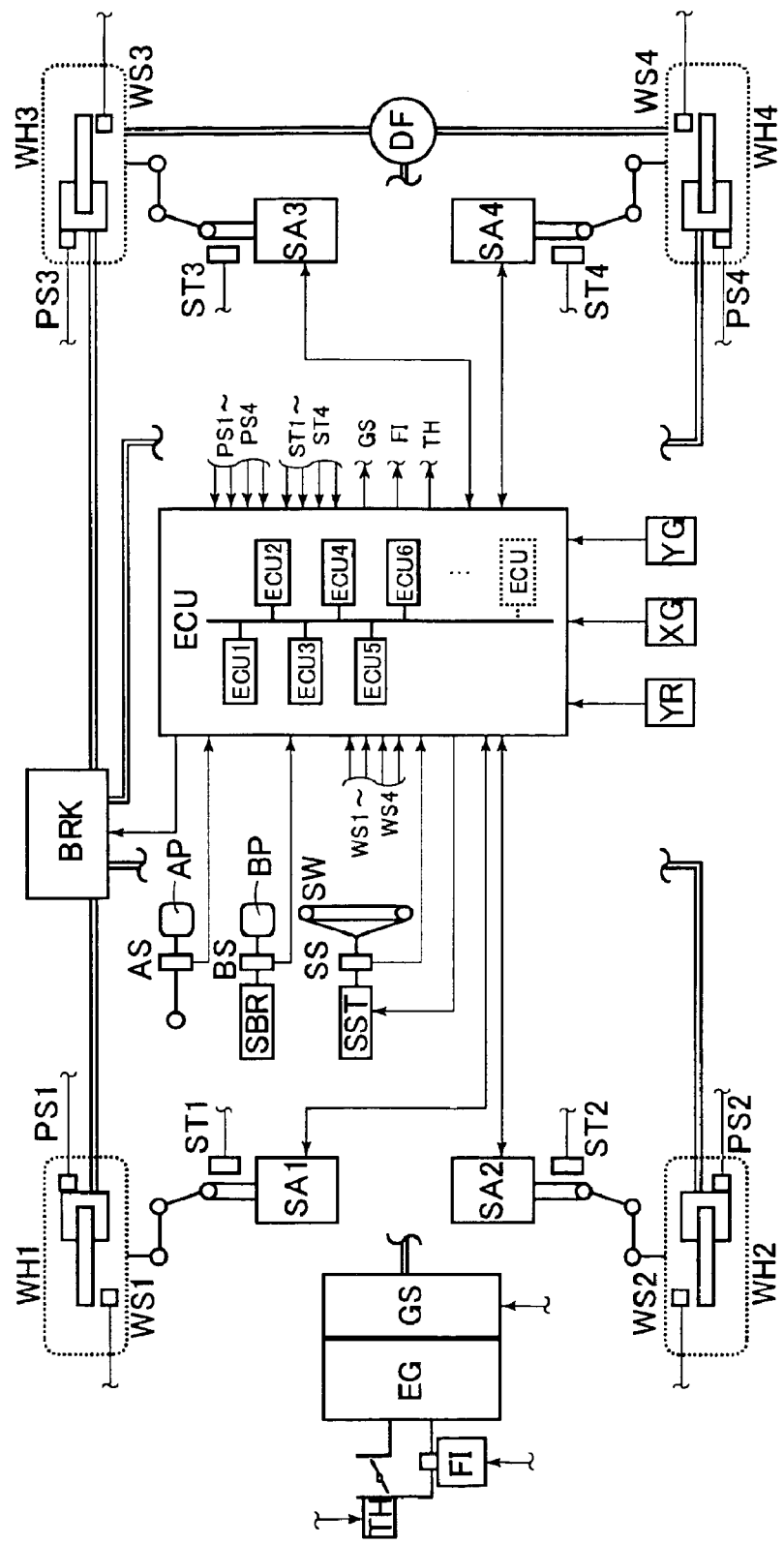
FIG. 3 is a schematic block diagram of a vehicle motion control apparatus according to an embodiment of the present invention.
Figure 4:
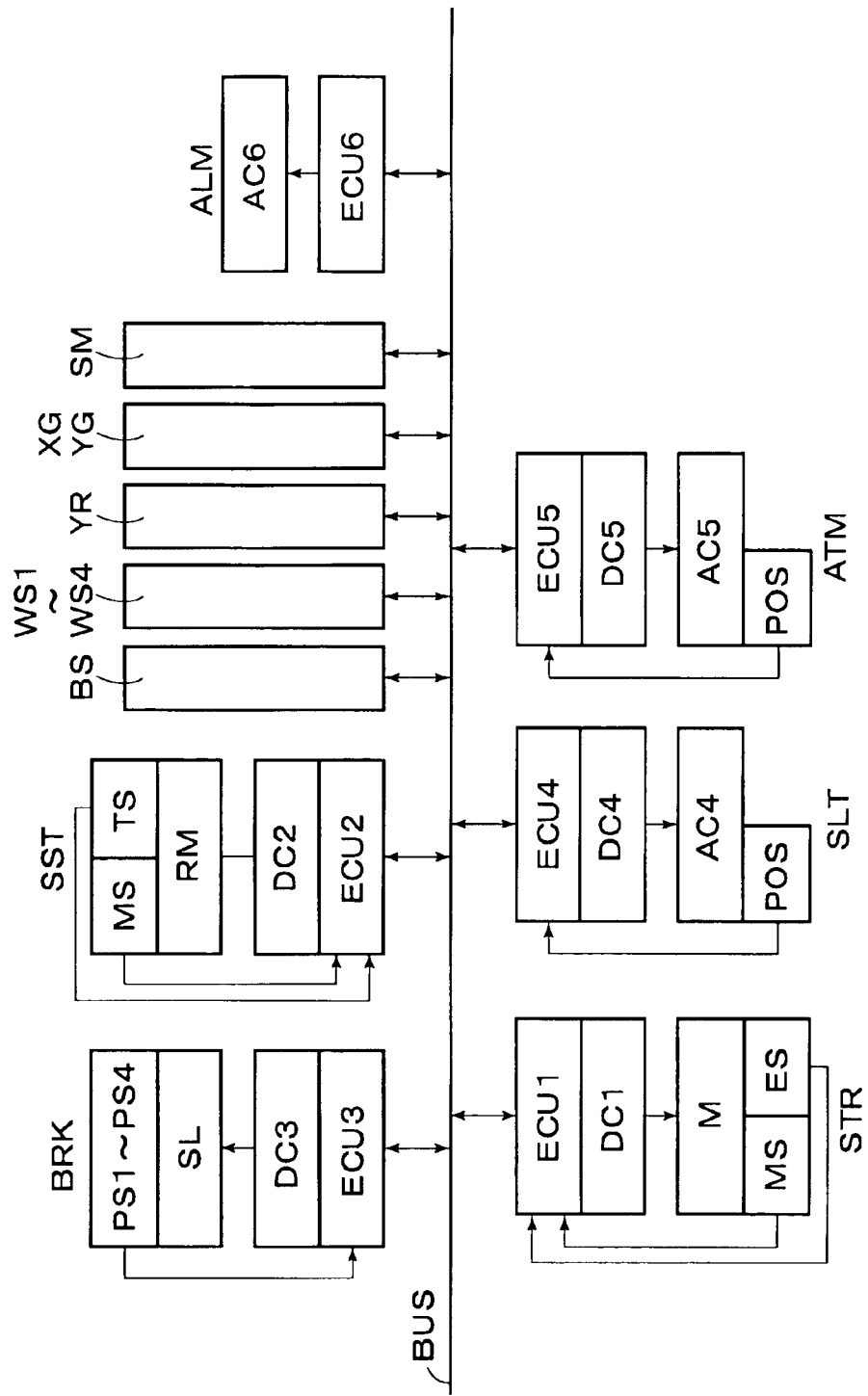
FIG. 4 is a block diagram illustrating systems of a motion control apparatus according to an embodiment of the present invention.

Referring to FIGS. 3–6, there is schematically illustrated a vehicle with a motion control apparatus having a road condition estimation apparatus according to an embodiment of the present invention. The vehicle of the present embodiment is structured as shown in FIG. 3, and constituted as shown in FIG. 4 by a steering control system (STR), steering reaction force simulator (SST), brake control system (BRK), throttle control system (SLT), shift control system (ATM), and warning system (ALM), which are connected with each other through a communication bus, so that each system may hold each information commonly. In the steering control system (STR) of the present embodiment, steering actuators SA1–SA4 are provided for wheels WH1–WH4, respectively, as shown in FIG. 3.

As shown in FIG. 3, at the wheels WH1–WH4, there are provided wheel speed sensors WS1–WS4, respectively, which are connected to the electronic controller ECU, and by each of which a signal having pulses proportional to a rotational speed of each wheel, i.e., a wheel speed signal is fed to the electronic controller ECU. Furthermore, there are provided a brake switch BS which turns on when the brake pedal BP is depressed, and turns off when the brake pedal BP is released, steering angle sensor FS for detecting a steering angle $\theta xx$ of the front wheels WH1 and WH2, a steering angle sensor RS for detecting a steering angle $\theta r$ of the rear wheels WH3 and WH4, a longitudinal acceleration sensor XG for detecting a vehicle longitudinal acceleration Gx, a lateral acceleration sensor YG for detecting a vehicle lateral acceleration Gy, a yaw rate sensor YR for detecting a yaw rate $\gamma$ of the vehicle, and so on, which are electrically connected to the electronic controller ECU.

According to the present embodiment, the steering control system includes the steering control system (STR) as described above, so that it is so constituted that each wheel is controlled to be steered by an actuator, which is separated mechanically from a steering wheel SW served as a manually operated steering member. That is, as shown in FIG. 3, the steering wheel SW and each of the wheels WH1–WH4 are not connected mechanically with each other. Therefore, the operation of the steering wheel SW is detected at a steering operation detection unit SS, which may be constituted by a steering (wheel operation) angle sensor SM (in FIG. 4), steering (wheel operation) torque sensor (not shown), or the like. In the steering control system (STR), a steering control unit ECU1 which is provided with CPU, ROM and RAM for the steering control, and to which a turning angle sensor and an electric current sensor are connected, and a motor M is connected through a drive circuit DC1. In operation, a desired steering angle (target value) θxxt for the steering angle of each wheel is provided in the steering control unit ECU1, on the basis of the amount of steering operation by the driver detected at the steering operation detection unit SS as shown in FIG. 3, and vehicle state variable (vehicle speed, yaw rate, longitudinal acceleration, lateral acceleration, vehicle slip angle or the like), frictional state between each wheel and the road surface, and so on. In this case, "xx" designates each wheel so that "fr" designates the wheel at the front right side, "fl" designates the wheel at the front left side, the "rr" designates the wheel at the rear right side, and the "rl" designates the wheel at the rear left side. On the basis of the desired steering angle θxxt, therefore, the steering actuators SA1–SA4 operatively mounted on the wheels, respectively, is actuated individually to control the steering angle θxx for each wheel.

Furthermore, the steering reaction force simulator (SST) is controlled to provide appropriate reaction force, in accordance with the vehicle state when running, or the state of the steering wheel SW when being operated. As shown in FIG. 3, the steering reaction force simulator (SST) is operatively connected to the steering wheel SW, and, as shown in FIG. 4, the turning angle sensor MS and torque sensor TS are connected to the control unit ECU2, to which a reaction motor RM is connected through a drive circuit DC2. Accordingly, a torque can be produced by the reaction motor RM and a resilient member (not shown) for producing force applied to the steering wheel SW in a direction for positioning it to hold the vehicle moving straight forward, as disclosed in the publication No.2001-191937.

Figure 5:
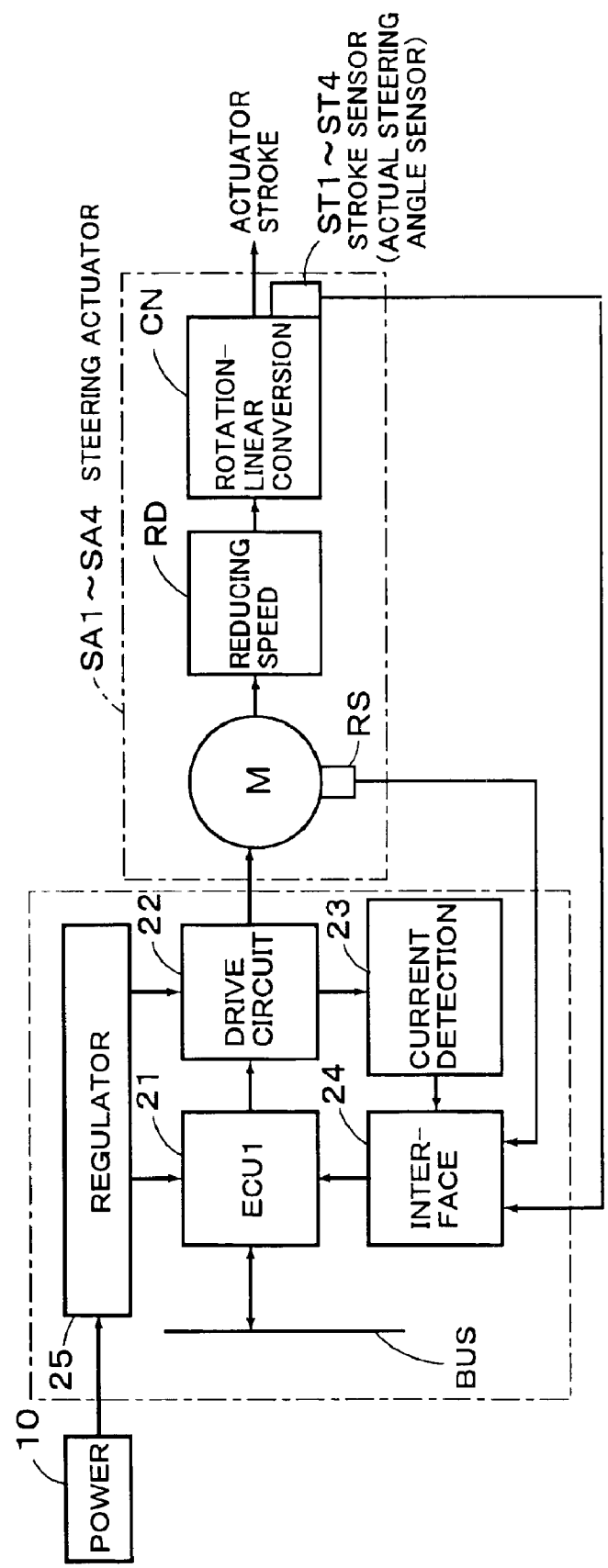
FIG. 5 is a block diagram of a steering control unit in a steering control system of a vehicle motion control apparatus according to an embodiment of the present invention.

The steering control unit for use in the steering control system (STR) is constituted as shown in FIG. 5. The information about the state of steering operation by the driver and the moving vehicle state (vehicle speed, yaw rate, longitudinal acceleration, lateral acceleration, vehicle slip angle, or the like) is fed through a communication bus into the steering control unit ECU1, where the desired value θxxt of steering angle of the wheel is calculated. And, on the basis of the desired steering angle θxxt, the motor M is actuated through a drive circuit 22. As for the motor M, a brushless DC motor may be employed, and a rotation angle sensor RS is operatively mounted on it. However, the motor M is not limited to that DC motor, but may be employed those of other types. In operation, the motor M is actuated to be controlled in response to the signal detected by the rotation angle sensor RS. Then, reaction torque to the road surface can be estimated on the basis of electric current detected by a current detection section 23 which is provided in the drive circuit 22. In FIG. 5, 24 indicates an interface, 25 indicates a constant voltage regulator, and 10 indicates a power source.

The motor M is connected to a transforming mechanism CN through a reducing speed mechanism RD, so that rotational motion of the motor M is transformed into linear motion of a knuckle arm (not shown). As for the transforming mechanism CN, may be used a ball-and-screw, ball-and-nut or the like (not shown). According to the transforming mechanism CN, therefore, each of the steering actuators SA1–SA4 produces a stroke for moving the knuckle arm back and forth, to provide a steering angle for each wheel.

In this case, the actual steering angle of each wheel is detected by each of stroke sensors ST1–ST4.

Figure 6:
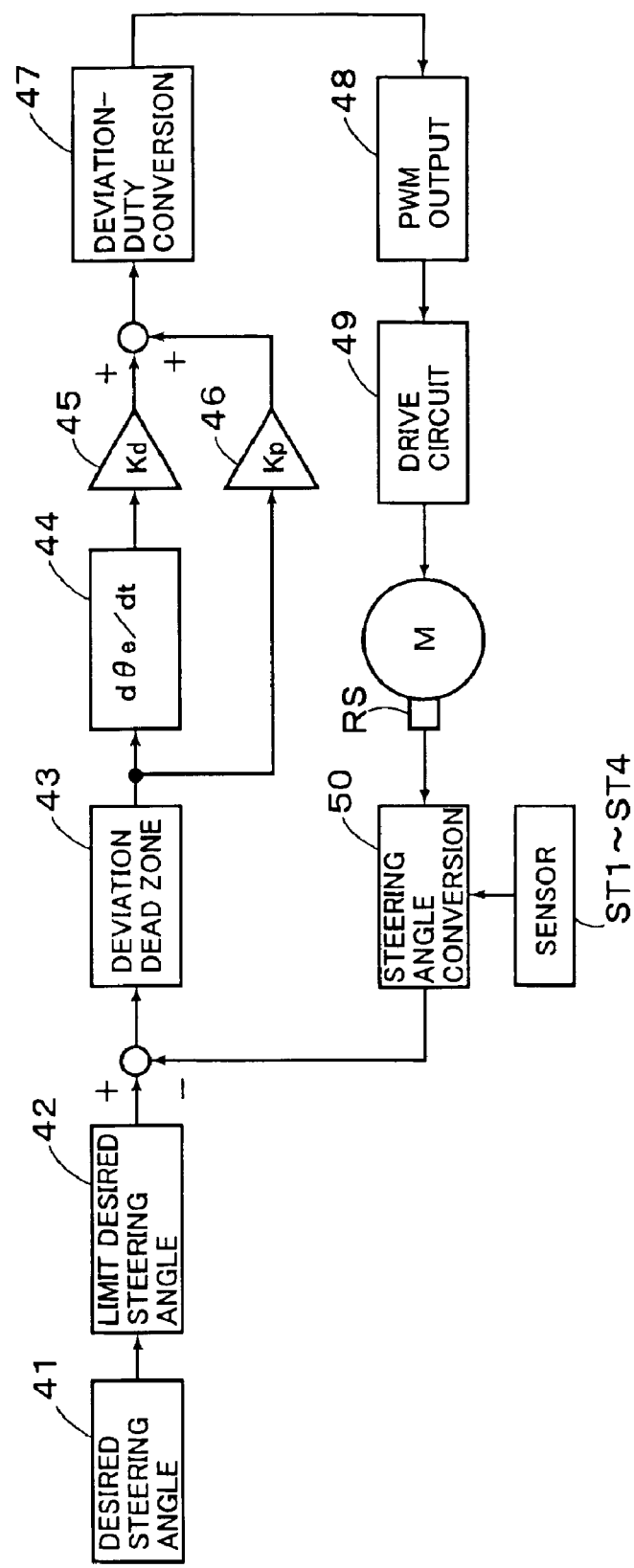
FIG. 6 is a block diagram of a steering control system of a vehicle motion control apparatus according to an embodiment of the present invention.

With respect to the motor M for use in the steering control system (STR), it is controlled as shown in FIG. 6, for example. At the outset, on the basis of the state of steering operation by the driver and the moving vehicle state, the desired steering angle θxxt for each wheel is calculated at a unit 41. Then, a limit to the desired steering angle is provided in accordance with the vehicle speed for the sake of fail safe, at a unit 42. And, the PD control is performed on the basis of a deviation between the desired steering angle θxxt and the actual steering angle θxx at units 43–50, so that the motor M is actuated in accordance with the duty ratio for the PWM control, which is calculated on the basis of the steering angle deviation. As each unit is constituted in substantially the same manner as disclosed in the aforementioned publication No.7-329808, its explanation is omitted.

Next, the brake control system (BRK) according to the present embodiment is constituted by a so-called brake-by-wire system. As shown in FIG. 3, wheel speed sensors WS1–WS4 are operatively mounted on the wheels WH1–WH4, respectively, and pressure sensors PS1–PS4 are provided for detecting the pressure of the wheel brake cylinders (not shown). Then, as shown in FIG. 4, the pressure sensors PS1–PS4 are connected to a brake control unit ECU3, to each of which a solenoid valve SL is connected through a solenoid drive circuit DC3. And, the operation of the brake pedal BP by the driver is detected at a braking operation detection unit including a brake switch BS, a brake pedal stroke sensor (not shown), or the like. The pressure in a wheel brake cylinder of each wheel is controlled on the basis of the amount of operation of the brake pedal BP by the vehicle driver, the moving vehicle state, the frictional state between the wheel and the road surface, and so on. The brake control system of the present embodiment is adapted to perform the anti-skid control (ABS), brake assist control (BA), traction control (TRC), vehicle stability control (VSC), and adaptive cruise control (ACC).

According to the present embodiment, an engine EG is an internal combustion engine which is provided with a fuel injection apparatus FI and a throttle control apparatus TH, which is served as the throttle control system (SLT), and which is adapted to provide a desired throttle opening in response to operation of an accelerator pedal AP, and actuated in response to an output signal of an electronic controller ECU to control the throttle control apparatus TH, and actuate the fuel injection apparatus FI to control the injected fuel. As shown in FIG. 4, a position sensor POS is connected to a throttle control unit ECU4, to which a throttle control actuator AC4 is connected through a drive circuit DC4. According to the present embodiment, the engine EG is operatively connected with the rear wheels WH3 and WH4 through a transmission GS and differential gear DF to provide a so-called rear-drive system, but the present embodiment is not limited to the rear-drive system.

The shift control system (ATM) includes a shift control unit ECU5 for the shift control of the automatic transmission, to which a shift control actuator AC5 is connected through a drive circuit DC5. The warning system (ALM) is adapted to output a warning signal when the estimated grip factor is less than a predetermined value, and includes a warning control unit ECU6, to which a warning apparatus AC6 for providing the warning information through an indicator or audio system or the like. Those control units ECU1–ECU6 are connected to the communication bus through a communication unit provided with CPU, ROM and RAM for the communication, respectively.

Accordingly, the information required for each control system can be transmitted by other control systems.

Figure 7:
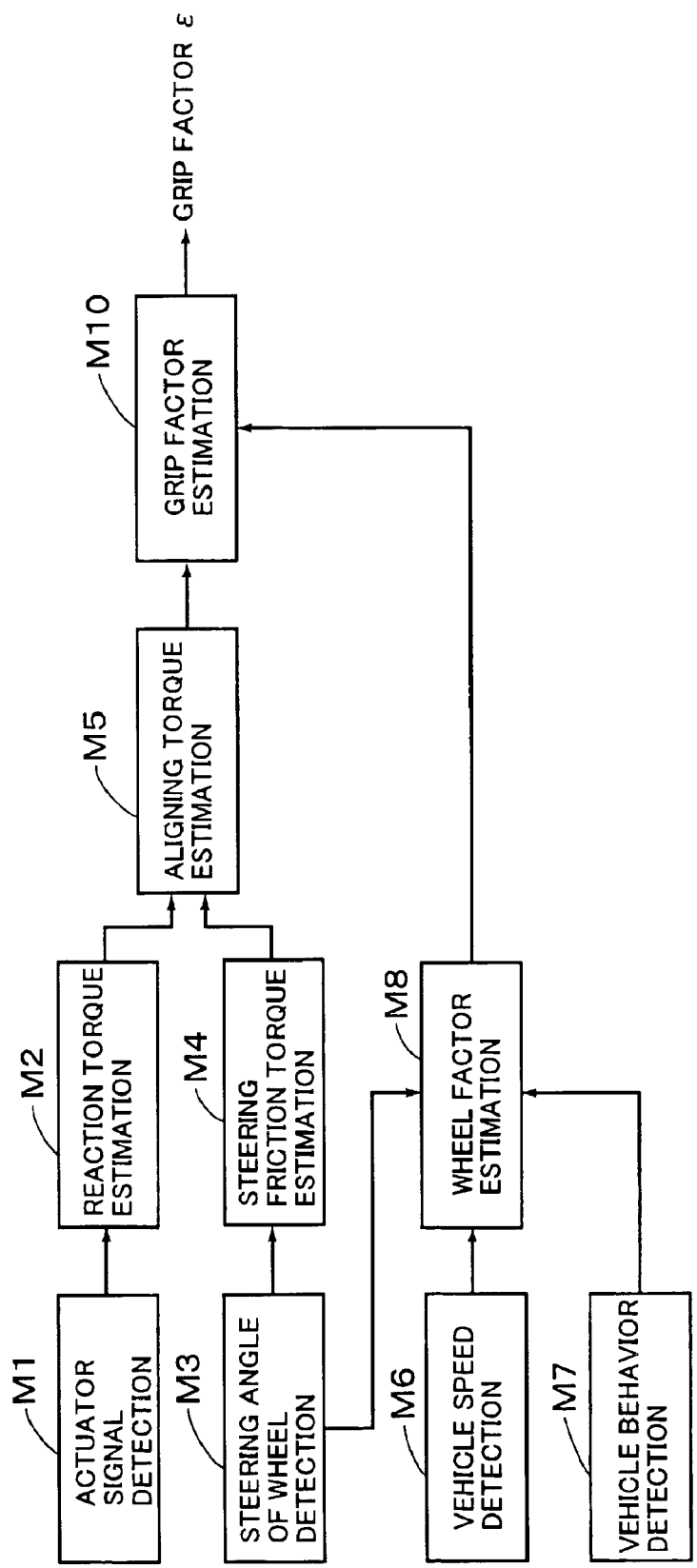
FIG. 7 is a block diagram of a grip factor estimation apparatus according to an embodiment of the present invention.

FIG. 7 shows a grip factor estimation apparatus according to an embodiment of the present invention, which is based upon the fact that the reaction torque of the wheel applied by the road surface can be estimated by detecting a signal (electric current) for actuating the motor M, because the electric current for actuating the motor M is proportional to an output torque. As the estimated reaction torque includes the components resulted from the friction of the members in the steering system, the reaction torque estimated by the electric current for actuating the motor M is compensated by the components resulted from the friction of the members in the steering system, to obtain the aligning torque Tsa. On the basis of the relationship between the aligning torque Tsa and the wheel factor indicated by the wheel slip angle or side force, the grip factor ϵ indicative of the grip state of the wheel against the road surface can be estimated.

Referring to FIG. 7, the electric current for actuating the motor M under the steering control is detected at an actuator signal detection unit M1 (e.g., current detection section 23 in FIG. 5), and the reaction torque is estimated at a reaction torque estimation unit M2 on the basis of the detected result of the actuator signal detection unit M1. Also, the steering angle of the wheel is detected at a steering angle of wheel detection unit M3, then, on the basis of the detected steering angle of the wheel, the steering friction torque corresponding to the friction component of the members in the steering system is estimated at a steering friction torque estimation unit M4. On the basis of the estimated reaction torque and the steering friction torque, the aligning torque is estimated at an aligning torque estimation unit M5. On the basis of the vehicle speed detected at a vehicle speed detection unit M6, the vehicle behavior detected at a vehicle behavior detection unit M7, and the steering angle of the wheel detected at the steering angle of wheel detection unit M3, at least one wheel factor out of the wheel factors Wx including the side force Fy to the wheel and the wheel slip angle α is estimated at a wheel factor estimation unit M8. Then, on the basis of the variation of the aligning torque estimated at the aligning torque estimation unit M5 to the wheel factor estimated at the wheel factor estimation unit M8, the grip factor ϵ of the wheel is estimated at a grip factor estimation unit M10.

Figure 8:
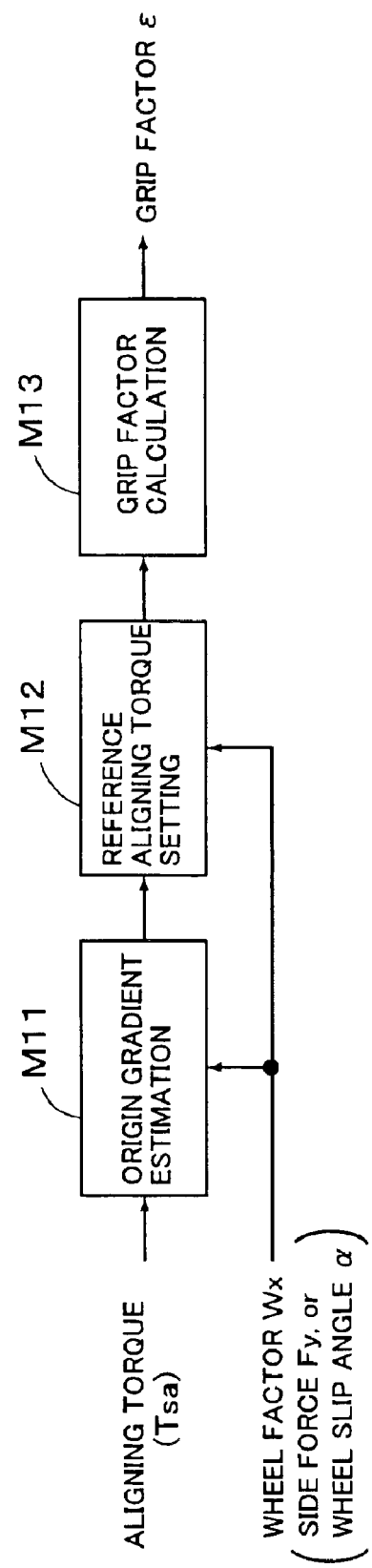
FIG. 8 is a block diagram of a grip factor estimation unit according to an embodiment of the present invention.

FIG. 8 shows an example of the grip factor estimation unit M10, wherein the grip factor ϵ of the wheel is estimated on the basis of the aligning torque and wheel factor (side force Fy, or wheel slip angle α). On the basis of the aligning torque Tsa estimated at the aligning torque estimation unit M5 and the wheel factor Wx of the side force Fy or the wheel slip angle α estimated at the wheel factor estimation unit M8, a gradient (K) of the aligning torque in the vicinity of the origin (abbreviated as origin gradient), i.e., the origin gradient (K) of the aligning torque to the wheel factor Wx is estimated at an origin gradient estimation unit M11. On the basis of the origin gradient (K), a reference aligning torque which provides for a wheel in a state almost completely gripped in its lateral direction is set at a unit M12. Then, the grip factor ϵ is obtained at a grip factor calculation unit M13, on the basis of the actual aligning torque obtained at the aligning torque estimation unit M5 and the reference aligning torque as set above.

Figure 9:
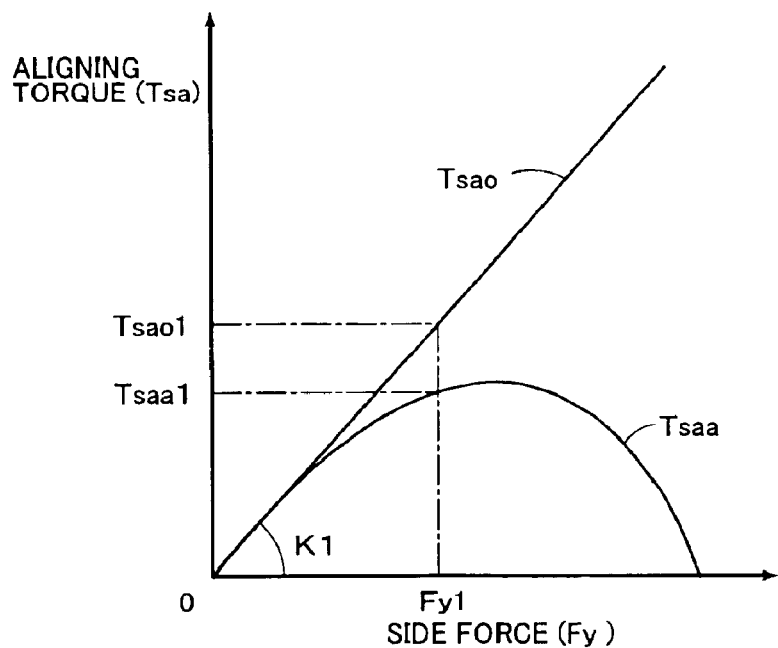
FIG. 9 is a diagram showing a relationship between aligning torque and side force according to an embodiment of the present invention.

Referring to FIG. 9, an example for estimating the grip factor ϵ when the side force Fy is used for the wheel factor Wx will be explained hereinafter. At the outset, the aligning torque Tsa to the side force Fy is of the characteristic as indicated by "Tsaa" in FIG. 9. As described before, if the actual aligning torque is indicated by "Tsaa" and the side force is indicated by "Fy", "Tsaa" can be obtained by the equation of Tsaa=Fy·($e_n$+$e_c$), so that the nonlinear characteristic of the actual aligning torque Tsaa to the side force Fy corresponds to the linear variation of the pneumatic trail $e_n$. Therefore, a gradient (K1) of the actual aligning torque Tsaa in the vicinity of the origin (0), where the front wheel is in the gripped state, to the side force Fy is identified, to obtain the characteristic of the aligning torque in the completely gripped state, i.e., reference aligning torque Tsao. With respect to the gradient (K1) corresponding to the origin gradient of the aligning torque, a predetermined value is set as an initial value at the outset, then it is corrected by identifying the gradient (K1) while the vehicle is running at an approximately constant speed, with the period of acceleration or deceleration of the vehicle eliminated.

As the pneumatic trail $e_n$ varies in response to the gripped state of the wheel, the reference aligning torque Tsao indicative of the state of the wheel which is almost completely gripped in its lateral direction can be set by the gradient (K1) in the vicinity of the origin, where the wheel is in such a state as almost completely gripped in its lateral direction (state of moving straight forward), to provide Tsao=K1·Fy. Then, the grip factor ϵ can be obtained by the ratio of the reference aligning torque Tsao and the actual aligning torque Tsaa. For example, when the side force is "Fy1", the reference aligning torque Tsao is set as "Tsao1" (=K1·Fy1), and the actual aligning torque Tsaa is obtained as "Tsaa1", so that the grip factor ϵ is obtained by ϵ=Tsaa1/Tsao1.

Figure 10:
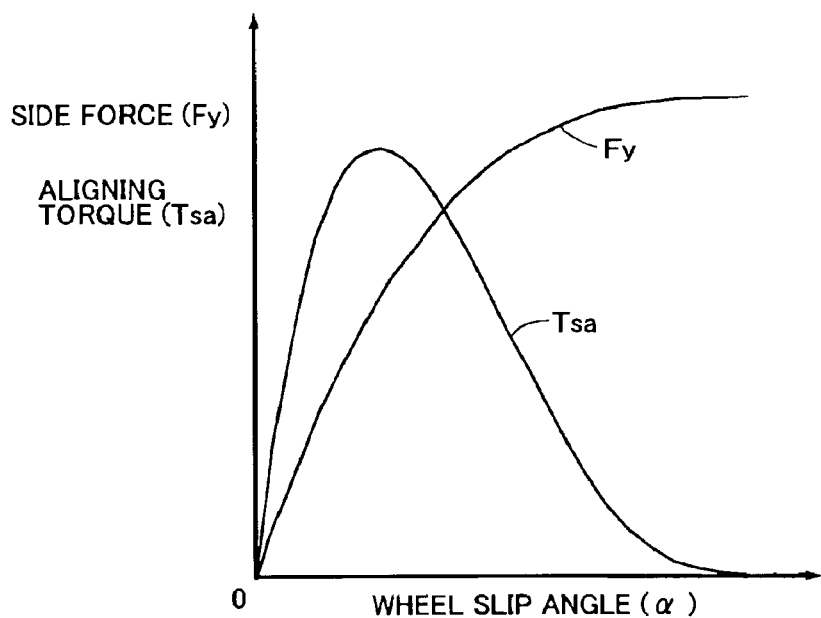
FIG. 10 is a diagram showing a relationship between aligning torque and side force to wheel slip angle according to an embodiment of the present invention.
Figure 11:
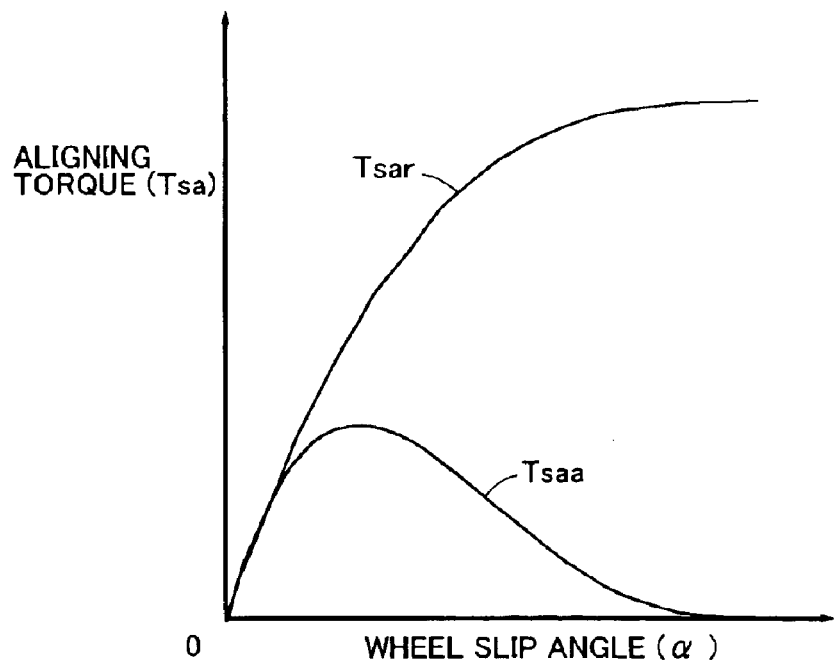
FIG. 11 is a diagram showing a relationship between aligning torque and wheel slip angle according to an embodiment of the present invention.

Next, an example for estimating the grip factor ϵ when the wheel slip angle α is used as the wheel factor Wx will be explained hereinafter. At the outset, the aligning torque Tsa to the wheel slip angle α is of the characteristic as indicated in FIG. 10. In the same manner as the side force was used as the wheel factor, the reference aligning torque in the almost completely gripped state will be of the nonlinear characteristic to the wheel slip angle, as indicated by "Tsar" in FIG. 11. This nonlinear characteristic depends on the road coefficient of friction $\mu$. In order to set the reference aligning torque, therefore, it will be required to estimate the road coefficient of friction $\mu$. However, it is difficult to estimate the road coefficient of friction $\mu$, because the aligning torque Tsa will not be varied so much by the road coefficient of friction $\mu$, in the state where the grip factor is relatively high, i.e., with the wheel gripped at a relatively small slip angle, as described before.

Figure 12:
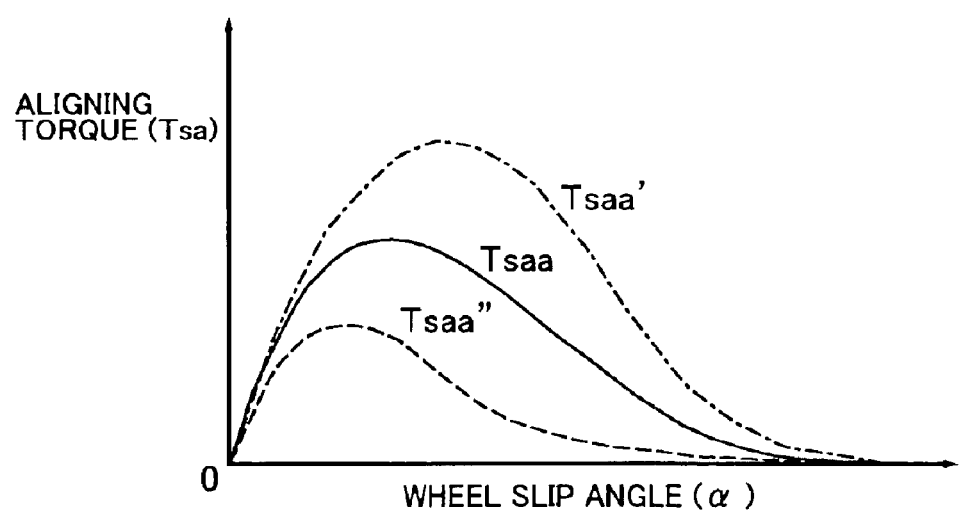
FIG. 12 is a diagram showing a relationship between aligning torque and wheel slip angle, with moving load varied, according to an embodiment of the present invention.

In addition, in order to obtain the grip factor independently for each wheel, and individually, by means of the wheel slip angle α, it is required to consider a moving load. If there exists the moving load, the characteristic of the aligning torque will become as shown in FIG. 12, wherein a solid line (Tsaa) indicates a first case without the moving load, one-dotted chain line (Tsaa') indicates a second case with the moving load increased, and broken line (Tsaa") indicates a third case with the moving load decreased. As the variation of aligning torque resulted from the moving load occurs in accordance with a predetermined relationship, the influence caused by the moving load can be compensated by setting a coefficient of correction in advance, for example. For example, the moving load ΔW can be obtained as ΔW=C1·Gx+C2·Gy (where C1 and C2 are coefficients, Gx is longitudinal acceleration, and Gy is a lateral acceleration). And, the aligning torque Tsa is obtained as Tsa=Tsaz·C3(Fz)·ΔW, whereby the influence of the moving load can be compensated, wherein Tsaz is a value of aligning torque which was estimated before the moving load is compensated, C3(Fz) is a coefficient with a function of a vertical load Fz (=static load+ΔW). In this case, C1, C2, c3 can be obtained experimentally.

Figure 13:
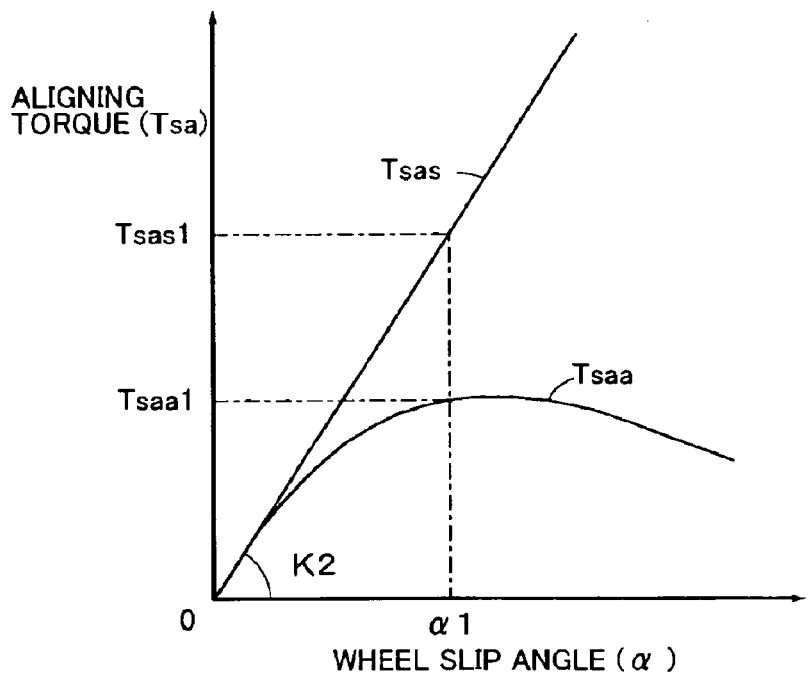
FIG. 13 is a diagram showing a relationship between aligning torque and wheel slip angle according to an embodiment of the present invention.

Therefore, the grip factor is estimated by approximating the reference aligning torque to the linear characteristic, as shown in FIG. 13, with a correction made to it against the influence by the moving load. That is, a gradient (K2) of the aligning torque Tsa in the vicinity of the origin of the wheel slip angle α, to the wheel slip angle α is obtained, to provide a reference aligning torque Tsas as Tsas=K2·α. Then, the grip factor ε can be obtained by the ratio of the reference aligning torque Tsas and the actual aligning torque Tsaa. For example, when the side force is "α1", the reference aligning torque is set as "Tsas1" (=K2·α1), and the grip factor ε is obtained by ε=Tsaa1/Tsas1.

Figure 14:
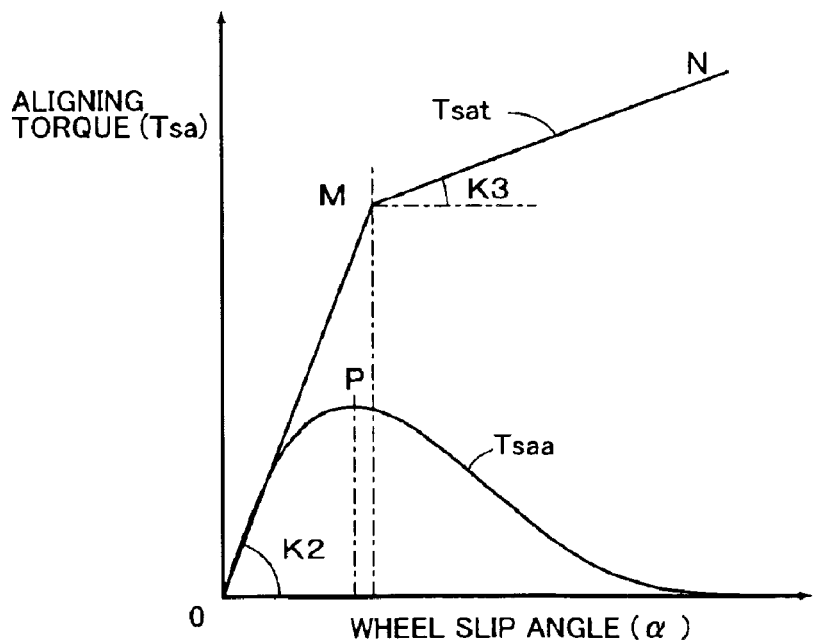
FIG. 14 is a diagram showing a relationship between aligning torque and wheel slip angle according to an embodiment of the present invention.

According to the method by approximating the reference aligning torque to the linear characteristic, as shown in FIG. 13, the accuracy in estimating the grip factor might be lessened in such an area that the wheel slip angle α is relatively large. In this case, therefore, the gradient of aligning torque may be set to "K3" as shown in FIG. 14, when the wheel slip angle exceeds a predetermined slip angle, and the nonlinearity of the reference aligning torque may be approximated to a straight line of "OMN" in FIG. 14. In this case, it is preferable that the gradient of aligning torque K3 is obtained in advance by an experiment, and identified to correct it while the vehicle is running. In FIG. 14, the point may be set on the basis of the inflection point (P) of the actual aligning torque. This is because the road coefficient of friction μ can be estimated on the basis of an inflection point of the aligning torque. Therefore, after the inflection point (P) of the actual aligning torque Tsaa is obtained, the wheel slip angle which is larger than the slip angle corresponding to the inflection point (P) by a predetermined value is set as the point, to change the gradient of the aligning torque from K2 to K3.

Figure 15:
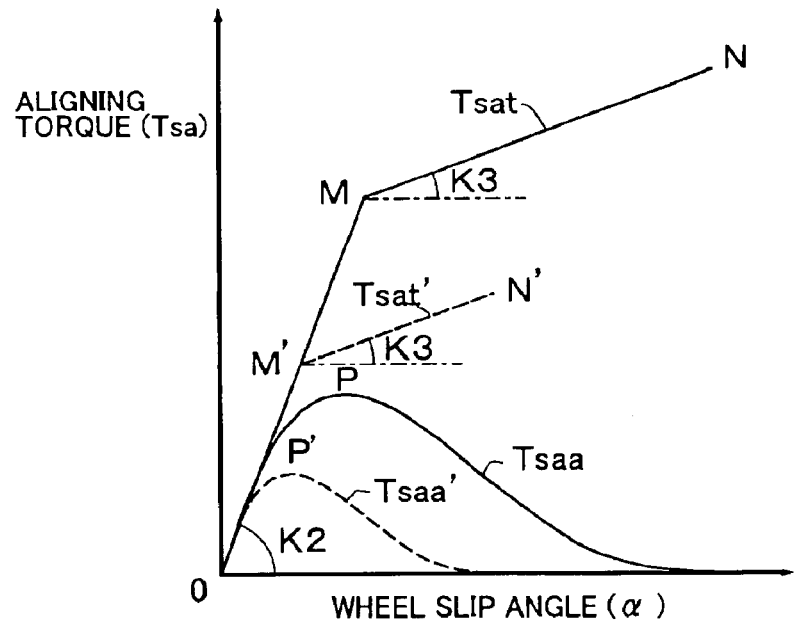
FIG. 15 is a diagram showing a relationship between aligning torque and wheel slip angle according to an embodiment of the present invention.

Furthermore, as the reference aligning torque to the slip angle is affected by the road coefficient of friction μ, the reference aligning torque characteristic may be set at high accuracy by setting the reference aligning torque on the basis of the inflection point (P) of the actual aligning torque Tsaa as shown in FIG. 15. For example, when the road coefficient of friction μ is reduced, the characteristic of the actual aligning torque Tsaa is changed from a rigid line to a broken line as shown in FIG. 15. In other words, if the road coefficient of friction μ is reduced, the inflection point of the actual aligning torque Tsaa is changed from the point (P) to a point (P'). Therefore, the reference aligning torque characteristic (Tsat) is required to change "OMN" to "OM'N'". In this case, the point (M') is set on the basis of the inflection point (P'), even if the road coefficient of friction μ is changed, the reference aligning torque characteristic can be set in accordance with the change of the road coefficient of friction μ.

Consequently, as shown in FIG. 15, the reference aligning torque characteristic can be accurately approximated to the one for the complete gripped state by setting the reference aligning torque as Tsat and Tsat' on the basis of the inflection points (P) and (P') of the actual aligning torque Tsaa and actual aligning torque Tsaa'. Furthermore, it is possible to set a point for altering the aligning torque gradient, in accordance with the road coefficient of friction which is estimated according to a method for estimating it on the basis of the grip factor as described later.

According to the embodiment as described above, the wheel slip angle was used for the wheel factor, and when the grip factor was estimated on the basis of the relationship between the wheel slip angle and the aligning torque, the influence by the moving load was compensated for the estimation of the aligning torque. AS for the correction to the variation of moving load, instead of correcting the actual aligning torque in response to the variation of moving load, the reference aligning torque may be set on the basis of the variation of moving load, because the grip factor is estimated on the basis of the ratio between the actual aligning torque and the reference aligning torque. In this case, gradients K1, K2 and K3 of the aligning torque against the wheel slip angle are provided for the function of the variation of moving load. The variation of gradients K1, K2 and K3 in response to the variation of moving load can be provided experimentally, in advance.

Figure 16:
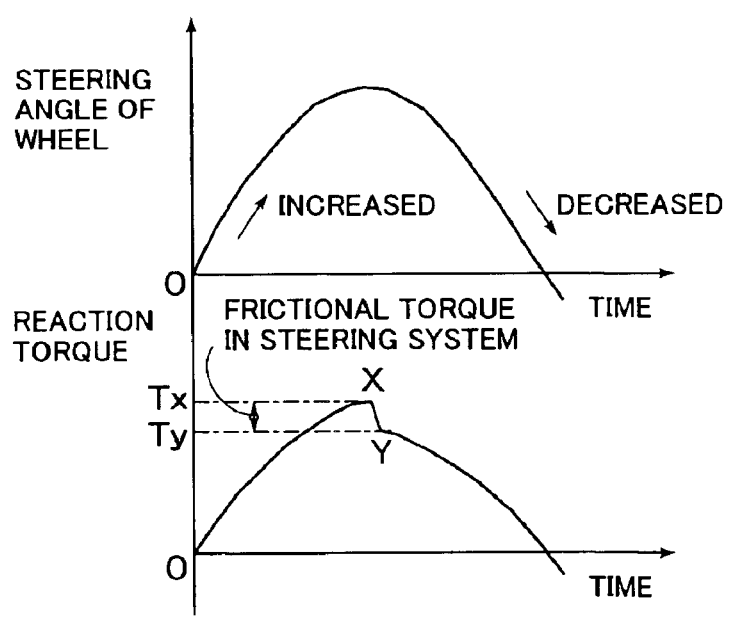
FIG. 16 is a diagram showing a characteristic of frictional torque resulted from the Coulomb's friction for use in correcting the aligning torque to be estimated, according to an embodiment of the present invention.
Figure 17:
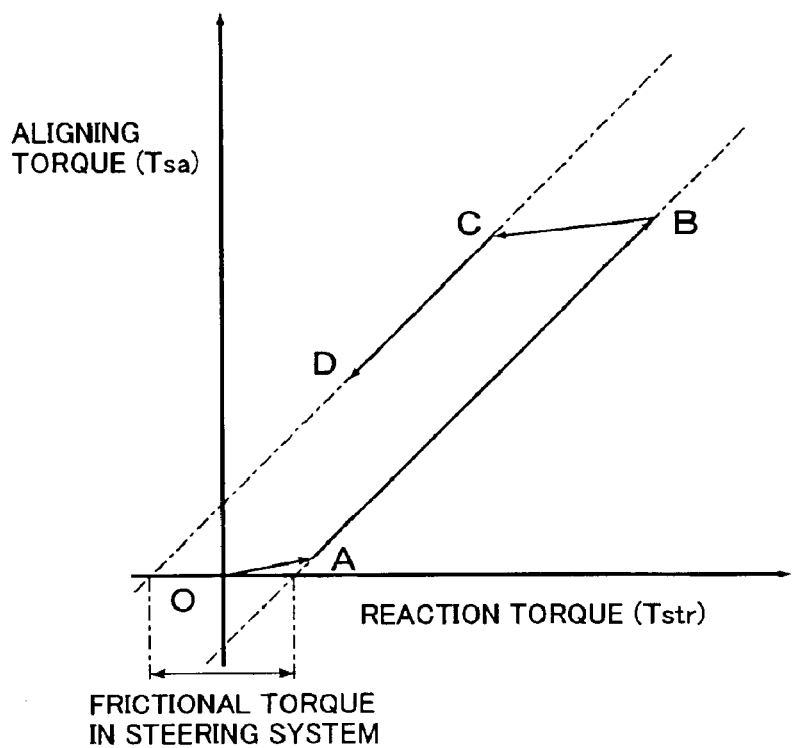
FIG. 17 is a diagram showing a characteristic of friction component of steering system for use in correcting the aligning torque to be estimated, according to an embodiment of the present invention.

As described before, in order to obtain the estimated reaction torque accurately, it is required to correct the reaction torque estimated by the electric current for actuating the motor M, on the basis of the frictional components in the steering system, as will explained hereinafter with reference to FIGS. 16 and 17. FIG. 16 shows a method for obtaining the frictional components resulted from the Coulomb's friction in the steering system. At the outset, the steering angle of the wheel is increased as shown in the upper section of FIG. 16, then the reaction torque is detected just before the wheel is returned toward its original position (reaction torque Tx at the position "X" in the lower section in FIG. 16). Next, the steering angle of the wheel is decreased as shown in the upper section of FIG. 16, and the reaction torque Ty is detected at a position, where a varying amount of the reaction torque is changed against a variation of the steering angle (position "Y" in the lower section in FIG. 16). Then, the torque Ty is subtracted from the torque Tx to provide a frictional torque in the steering system. This calculation is repeated every steering operation, and an average of the results obtained by a plurality number of calculations is used as the frictional torque.

Next, the correction by the frictional torque in the steering system will be explained with reference to FIG. 17. The relationship between the reaction torque and the aligning torque has a hysteresis as indicated by the one-dotted chain line in FIG. 17. As for the frictional torque in the steering system, the value obtained as shown in FIG. 16 is used, and a gradient of the aligning torque Tsa against the reaction torque Tstr is set as "1". When the vehicle is running along a straight lane, the reaction torque Tstr is zero. When the driver starts the steering operation to begin turning the steering wheel and the steering angle of the wheel begins to be increased, the reaction torque Tstr will be produced. First, the torque for compensating the Coulomb's friction will be produced, then the wheels (tires) will be turned to produce the aligning torque. Therefore, in the initial period for changing from the state where the vehicle is running along the straight lane to the state where the steering operation is performed (within a range of hysteresis caused by the frictional torque), the aligning torque has not been produced yet, with the reaction torque increased, as indicated by 0-A in FIG. 17. As a result, the estimated aligning torque will be output as the actual aligning torque Tsaa (this is in fact the estimated value with the correction made, but the word of "estimated" is omitted herein), with a slight gradient to the reaction torque. With the steering wheel turned (or rotated) further, if the reaction torque exceeds the friction torque area, the actual aligning torque Tsaa will be output along A-B in FIG. 17. If the steering wheel is returned toward its original position, so that the reaction torque is reduced, then the actual aligning torque Tsaa will be output along B-C in FIG. 17, with a slight gradient to the reaction torque. And, if the reaction torque exceeds the friction torque area, the actual aligning torque Tsaa will be output along C-D in FIG. 17, in the same manner as the steering wheel is turned further.

Figure 18:
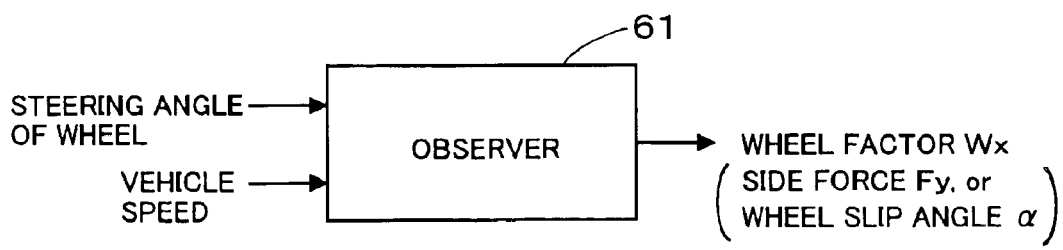
FIG. 18 is a block diagram for estimating a wheel factor on the basis of a steering angle of a wheel and a vehicle speed, by means of an observer based on a vehicle model, according to an embodiment of the present invention.
Figure 19:
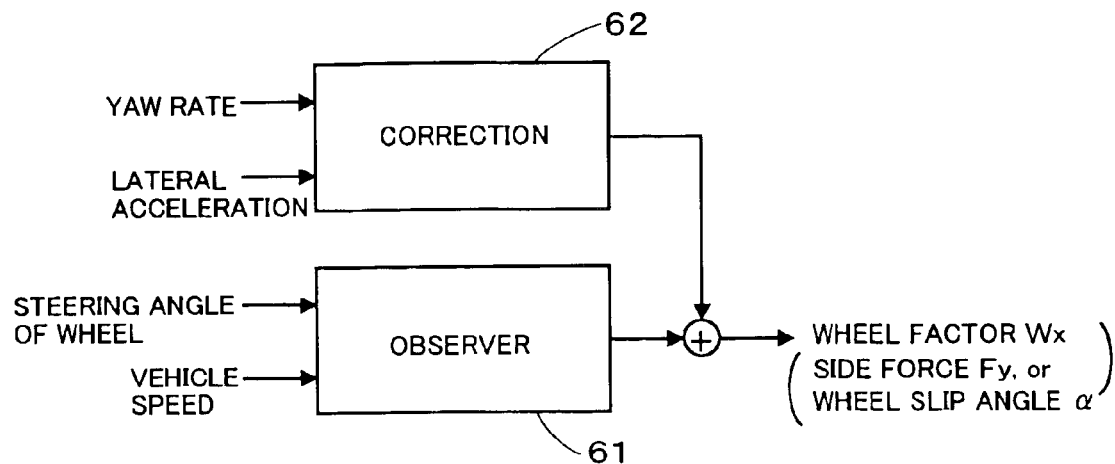
FIG. 19 is a block diagram for estimating a wheel factor on the basis of an observer based on a vehicle model, with a correction added thereto, according to an embodiment of the present invention.
Figure 20:
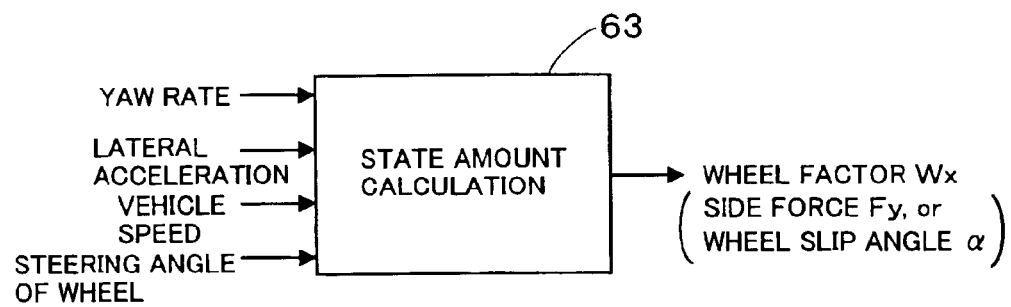
FIG. 20 is a block diagram for calculating a wheel factor directly, through a state variable calculation, without using an observer, according to an embodiment of the present invention.

FIGS. 18–20 show an embodiment for estimating the wheel factor Wx (side force Fy or wheel slip angle α in the present embodiment). FIG. 18 shows an embodiment for estimating the wheel factor on the basis of the steering angle of the wheel and the vehicle speed, by means of an observer 61 based on a vehicle model, which is indicated by a vehicle parameter such as a vehicle state equation and wheel base, a parameter indicative of a tire property, and the like. Next, FIG. 19 shows an embodiment for improving the estimation of the wheel factor, with a correction 62 made by a feed back of sensor signals such as lateral acceleration and yaw rate, on the basis of the observer 61 using the vehicle model. And, FIG. 20 shows a further embodiment for calculating the wheel factor Wx directly, by means of a state amount calculation 63 on the basis of the steering angle of the wheel, vehicle speed, lateral acceleration, yaw rate and the like, without using the observer as described above. Furthermore, more than two estimation units out of the plurality of estimation units may be performed in parallel, to obtain the wheel factor Wx with each estimated result weighted, respectively.

In the embodiments as described above, the grip factor ε was obtained on the basis of the aligning torque, in view of variation of the pneumatic trail of tire. Whereas, on the basis of a margin of side force for road friction, a grip factor indicative of a grip level of the tire in its lateral direction can be estimated (in this case "εm" is used herein), as described hereinafter.

According to a theoretical model of a tire, so-called brush model, which is used for analyzing the force produced on the tire, the relationship between the (actual) aligning torque Tsaa to the (front) side force Fy can be obtained in accordance with the following equations:

Provided that $\xi = 1 - \{Ks/(3 \cdot \mu \cdot Fz)\} \cdot \lambda$,

If $\xi > 0$, $Fy = \mu \cdot Fz \cdot (1 - \xi^3)$                  (1)

If $\xi \leq 0$, $Fy = \mu \cdot Fz$                             (2)

And,

If $\xi > 0$, $Tsaa = (1 \cdot Ks/6) \cdot \lambda \cdot \xi^3$                  (3)

If $\xi \leq 0$, $Tsaa = 0$                                (4)

where "Fz" is the vertical load, "l" is the length of the tire surface contacting the road, "Ks" is a constant corresponding to the tread hardness, "λ" is the side slip (λ=tan α), and "α" is the wheel slip angle.

In general, the slip angle α is small in the area of ξ>0, the equation of λ=α may be applied. As apparent from the equation (1), the maximal value of the side force is μ·Fz. Therefore, if a portion of side force according to the road coefficient of friction μ to the maximal value of side force is indicated by a coefficient of friction utilization ratio η, then the ratio η can be given by η=1-ξ³. Therefore, εm=1-η means a margin for (road) coefficient of friction, so that the grip factor εm can be given by εm=ξ³. As a result, the equation (3) can be rewritten by the following equation:

$Tsaa = (1 \cdot Ks/6) \cdot \alpha \cdot \epsilon m$                             (5)

The equation (5) indicates that the aligning torque Tsaa is proportional to the slip angle α and the grip factor εm. Then, if the characteristic obtained when εm=1 (the utilization ratio of coefficient of friction is zero, and the margin for coefficient of friction is 1) is used for the reference aligning torque characteristic, the reference aligning torque Tsau is given by the following equation:

$Tsau = (1 \cdot Ks/6) \cdot \alpha$                                 (6)

Then, the grip factor εm can be obtained by the equations (5) and (6) as follows:

$\epsilon m = Tsaa/Tsau$                                      (7)

In the equation (7), the road coefficient of friction μ is not included as the parameter. Thus, the grip factor εm can be calculated without using the road coefficient of friction μ. In this case, the gradient K4 (=1·Ks/6) of the reference aligning torque Tsau can be set in advance by means of the brush model, or can be obtained through experiments. Furthermore, if the initial value is set at first, then the gradient of the aligning torque is identified in the vicinity of the origin of the slip angle when the vehicle is running, to correct the initial value, the accuracy of the grip factor will be improved.

Figure 21:
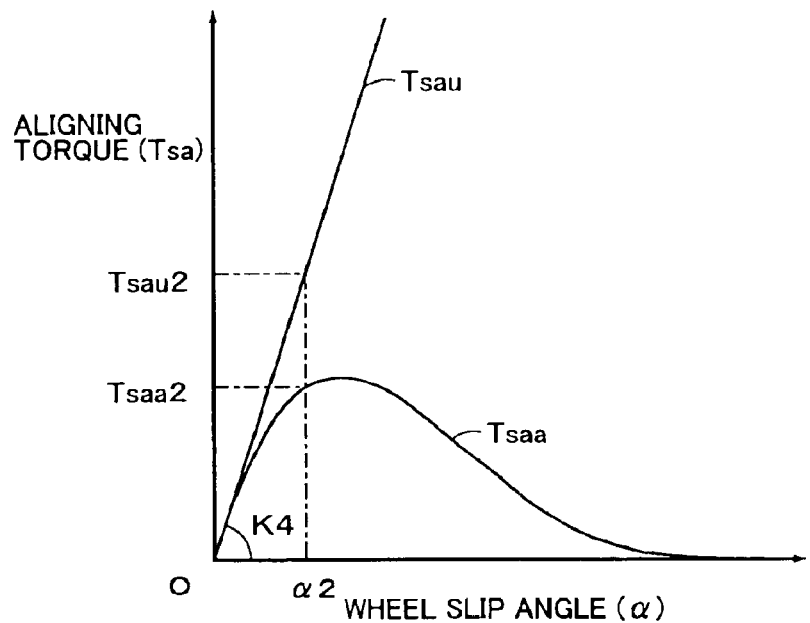
FIG. 21 is a diagram showing a relationship between aligning torque and wheel slip angle according to an embodiment of the present invention.

As shown in FIG. 21, for example, if the slip angle is α2, the reference aligning torque Tsau2 is given by Tsau2=K4·α2. And, the grip factor εm can be obtained by the following equation:

$\epsilon m = Tsaa2/Tsau2 = Tsaa2/(K4 \cdot \alpha 2)$

Figure 22:
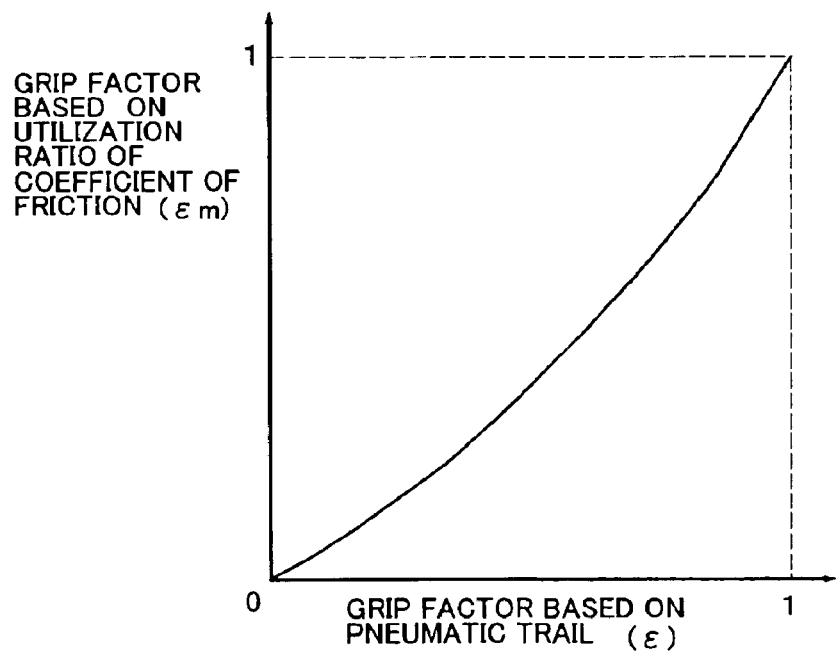
FIG. 22 is a diagram showing a relationship between a grip factor $\epsilon$ based on a pneumatic trail and a grip factor $\epsilon m$ based on a margin of side force for road friction, according to the present invention.

Accordingly, in lieu of te grip factor ε based on the pneumatic trail as described in FIGS. 15–24, the grip factor εm based on the margin of side force for road friction can be employed. The relationship between those grip factors ε and εm will be the one as shown in FIG. 22. Therefore, after the grip factor ε was obtained, then it may be converted into the grip factor εm. On the contrary, after the grip factor εm was obtained, then it may be converted into the grip factor ε.

Figure 23:
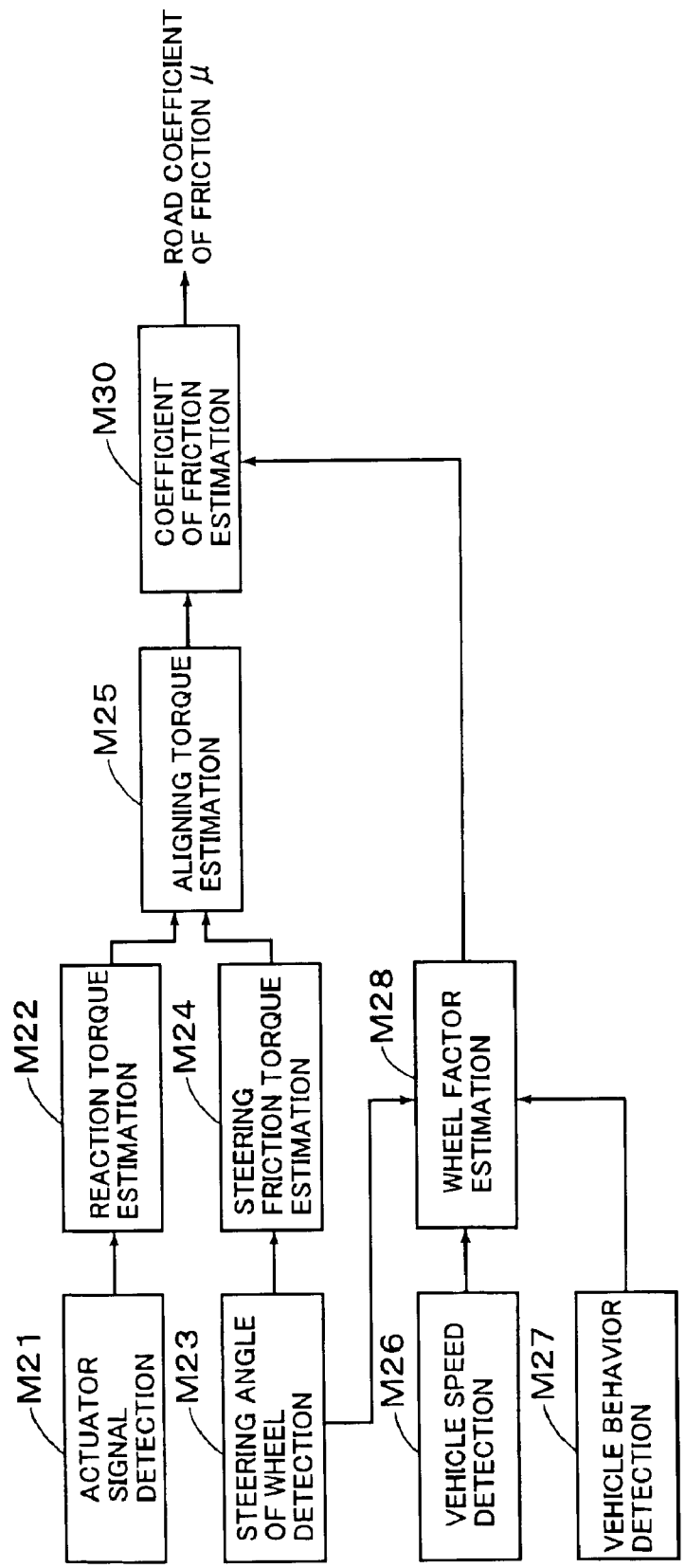
FIG. 23 is a block diagram showing a road coefficient of friction estimation apparatus, as an example of a road condition estimation apparatus according to an embodiment of the present invention.

Next will be explained an embodiment of the coefficient of friction estimation apparatus for estimating the road coefficient of friction μ on the basis of the aligning torque and the wheel factor such as the side force or wheel slip angle. FIG. 23 shows an embodiment of the coefficient of friction estimation apparatus, wherein the reaction force torque is calculated by the motor current at units M21–M25, in the same manner as the grip factor estimation apparatus as shown in FIG. 7 (In FIG. 23, "20" has been added to the number following "M" in each unit of FIG. 7) and the frictional torque in the steering system is adjusted, to estimate the aligning torque. The wheel factor is obtained through units M26–28 in the same manner as the blocks disclosed in FIGS. 18–20. Then, the road coefficient of friction μ is obtained at a coefficient of friction estimation unit 30, on the basis of the relationship between the wheel factor and the aligning torque.

Figure 24:
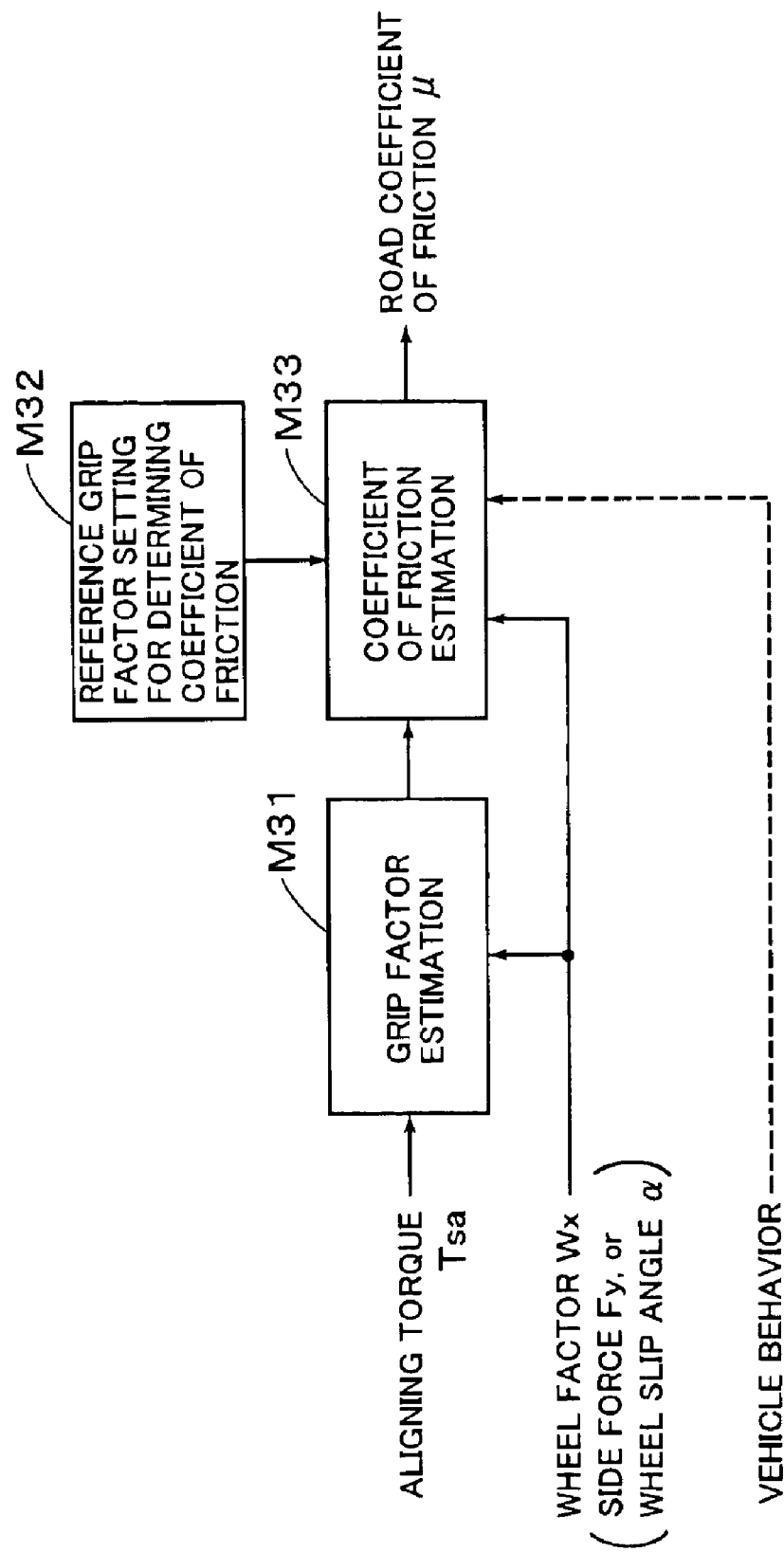
FIG. 24 is a block diagram showing an example for estimating a road coefficient of friction on the basis of an aligning torque and a wheel factor in a road condition estimation apparatus according to an embodiment of the present invention.

FIG. 24 shows an example of the coefficient of friction estimation unit M30, wherein the coefficient of friction is estimated on the basis of the aligning torque estimated at the aligning torque estimation unit M25 and the wheel factor estimated at the wheel factor estimation unit M28. At a unit M31, the grip factor ε is estimated on the basis of the aligning torque Tsa and the wheel factor Wx, as shown in FIGS. 7–15. At a unit M33 for estimating the road coefficient of friction, the road coefficient of friction μ is estimated on the basis of the aligning torque and the wheel factor which are obtained when the grip factor has reached a predetermined reference grip factor set at the reference grip factor setting unit M32 for determining the road coefficient of friction to estimate. As the wheel factor is affected by the vehicle behavior, the value indicative of the vehicle behavior obtained when reached the reference grip factor, i.e., lateral acceleration or yaw rate, may be used, in stead of the value indicative of the vehicle behavior.

Figure 25:
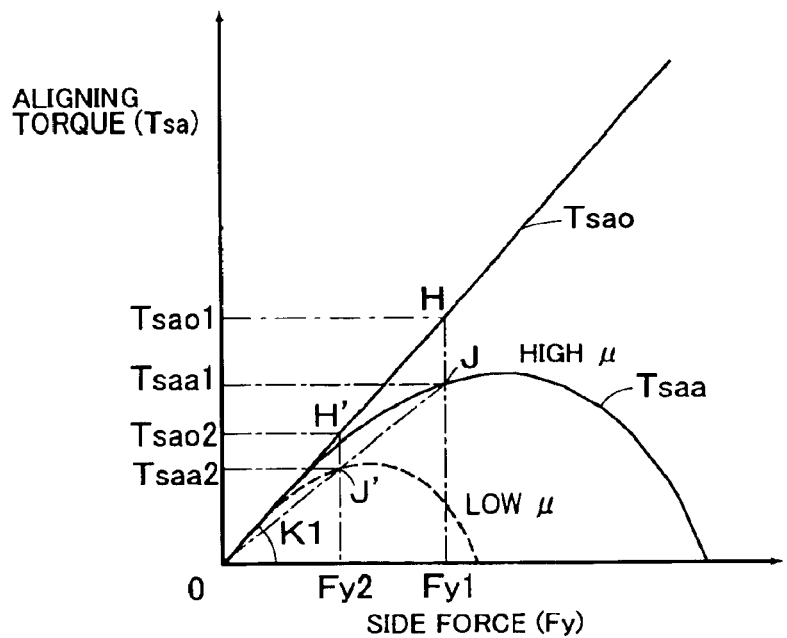
FIG. 25 is a diagram showing an example for estimating a road coefficient of friction, with a side force used as a wheel factor, in a road coefficient of friction estimation apparatus according to an embodiment of the present invention.

Referring to FIG. 25, an example for estimating the road coefficient of friction $\mu$ when the side force Fy is used as the wheel factor Wx will be explained hereinafter. In FIG. 25 shows the relationship between the side force Fy and the aligning torque Tsa when the road coefficient of friction $\mu$ was lessened, wherein a solid line indicates the characteristic at a high $\mu$ and a broken line indicates the characteristic at a low $\mu$. When the shape of the area of the road contacting the tire and elasticity of the tread rubber are constant, the characteristic of the side force to the aligning torque is analog to the road coefficient of friction $\mu$ (the characteristic of solid line and broken line in FIG. 25). Therefore, the side force Fy or the aligning torque Tsa provided when the grip factor $\epsilon$ obtained by a ratio between the reference aligning torque and the actual aligning torque is identical, directly reflects the road coefficient of friction $\mu$.

Accordingly, the grip factor $\epsilon$ obtained at the high $\mu$ is indicated by the equation of $\epsilon$=Line segment [J-Fy1]/Line segment [H-Fy1], and the grip factor $\epsilon'$ obtained at the low $\mu$ is indicated by the equation of $\epsilon'$=Line segment [J'-Fy2]/Line segment [H'-Fy2], so that a triangle [0-H-Fy1] is analogue to a triangle [0-H'-Fy2]. In case of $\epsilon=\epsilon'$, therefore, the ratio of Line segment [0-Fy1] to Line segment [0-Fy2], i.e., the ratio of the aligning torque Tsaa1 to the aligning torque Tsaa2, corresponds to the ratio of the road coefficient of friction $\mu$. As a result, by setting a certain grip factor on a dry asphalt road surface ($\mu$=approximately 1.0) as a reference, it is possible to estimate the road coefficient of friction $\mu$ on the basis of the side force Fy or aligning torque Tsa for providing the certain grip factor. Referring to FIG. 25, therefore, the road coefficient of friction can be estimated on the basis of the value of side force (Fy1, Fy2) or aligning torque (Tsaa1, Tsaa2) obtained when reached the reference grip factor (points J and J') in FIG. 25.

Likewise, the road coefficient of friction $\mu$ can be estimated when the wheel slip angle $\alpha$ is used as the wheel factor Wx, as will be explained hereinafter with reference to FIG. 26. In this case, the aligning torque Tsa has the nonlinear characteristic to the wheel slip angle $\alpha$, as explained before with respect to the estimation of the grip factor. Therefore, the characteristic of the aligning torque to the wheel slip angle is approximated to a linear characteristic as indicated by two-dotted chain line in FIG. 26, to estimate the road coefficient of friction $\mu$ in a linear zone (0-M zone) to the wheel slip angle $\alpha$.

Figure 26:
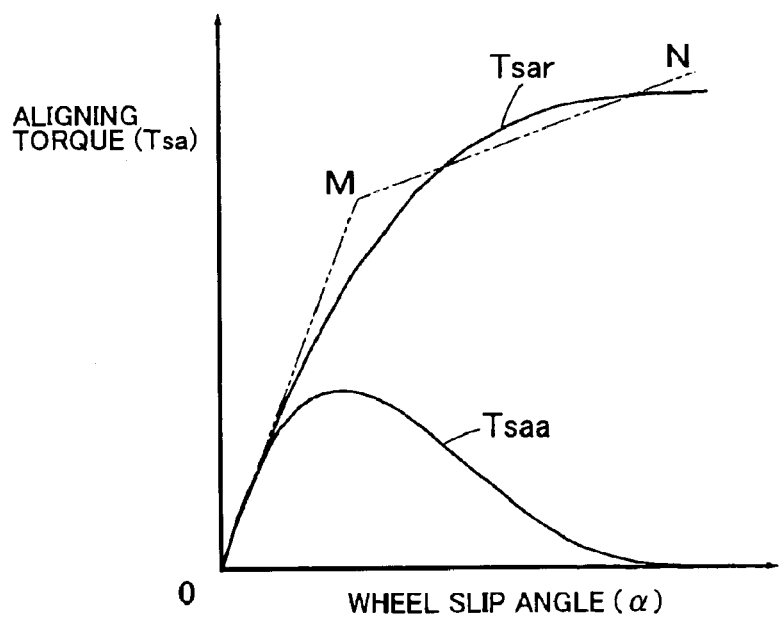
FIG. 26 is a diagram showing an example for estimating a road coefficient of friction, with a wheel slip angle used as a wheel factor, in a road coefficient of friction estimation apparatus according to an embodiment of the present invention.
Figure 27:
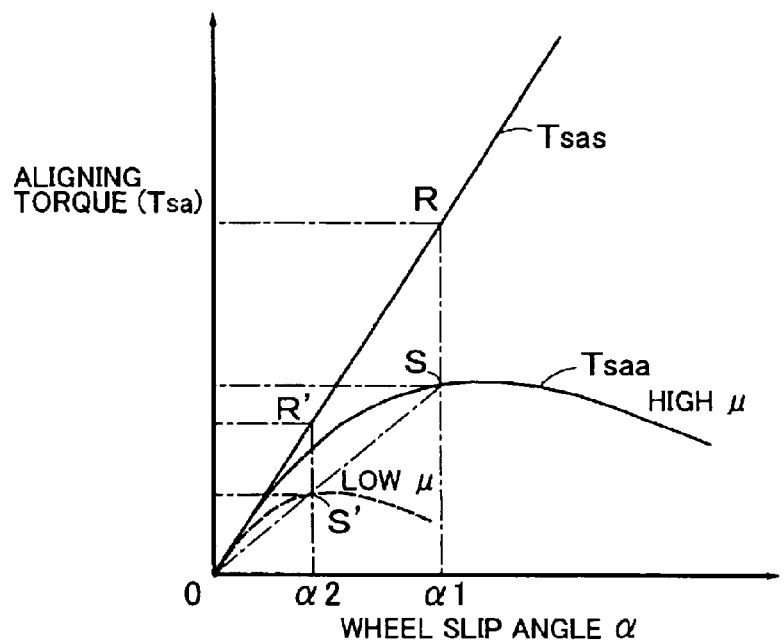
FIG. 27 is a diagram showing a relationship between wheel slip angle and aligning torque, in a road coefficient of friction estimation apparatus according to an embodiment of the present invention.

FIG. 27 shows the relationship between the wheel slip angle $\alpha$ and the aligning torque Tsa, as that in FIG. 26, wherein a solid line indicates when the coefficient of friction $\mu$ is high and a broken line indicates when the coefficient of friction $\mu$ is low. As apparent from FIG. 27, the characteristic of the wheel slip angle to the aligning torque is analog to the road coefficient of friction $\mu$ (the characteristic of solid line and broken line in FIG. 27), similar to that in FIG. 25. Therefore, the road coefficient of friction can be estimated on the basis of the value of aligning torque or wheel slip angle ($\alpha$1, $\alpha$2) obtained when reached the reference grip factor (points S and S' in FIG. 27) set in advance. In this case, the reference grip factor is required to be set in a zone where the relationship between the wheel slip angle and the side force is in a linear characteristic. Whereas, in order to estimate the road coefficient of friction accurately, it is required to be estimated in a zone where a certain difference will be caused between the reference aligning torque and the actual aligning torque. In view of those requirements, therefore, it is preferable to set the reference grip factor experimentally in such a state that the road coefficient of friction is relatively high as on the dry asphalt road surface, for example.

In the case where the estimation of the road coefficient of friction is made on the basis of the grip factor, in lieu of the grip factor $\epsilon$ based on the pneumatic trail, the grip factor $\epsilon$m based on the margin of side force for road friction can be employed. As the relationship between those grip factors $\epsilon$ and $\epsilon$m will be the one as shown in FIG. 22, after the grip factor $\epsilon$ was obtained, then it may be converted into the grip factor $\epsilon$m, whereas, after the grip factor $\epsilon$m was obtained, then it may be converted into the grip factor $\epsilon$.

Figure 28:
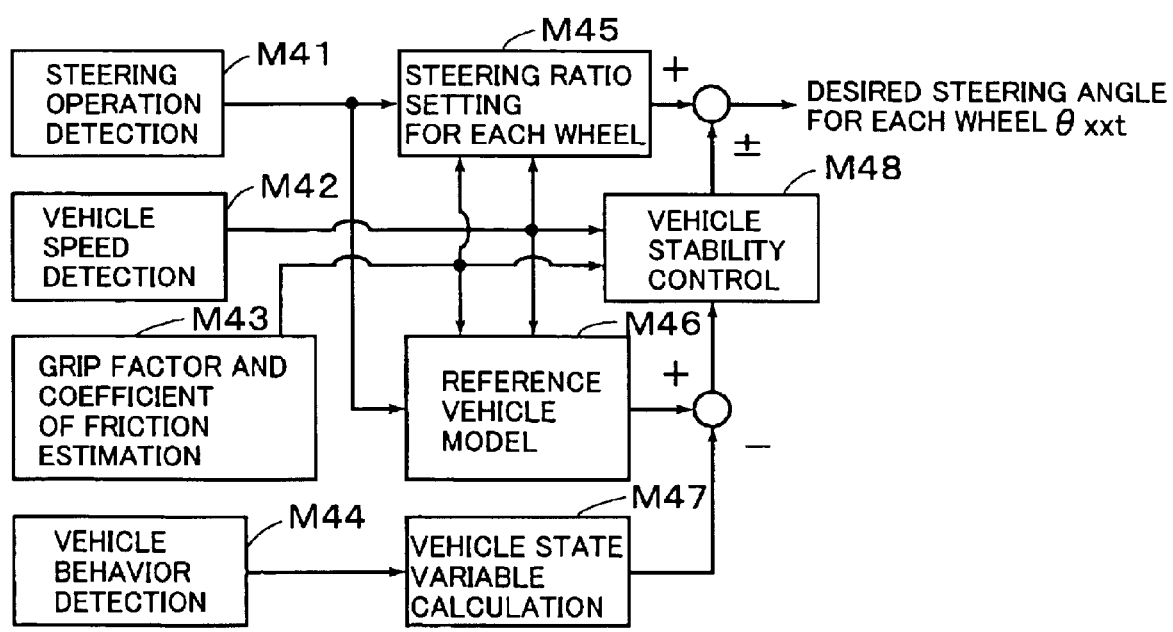
FIG. 28 is a block diagram for setting a desired wheel angle in a steer-by-wire system according to an embodiment of the present invention.

Next will be explained the vehicle motion control apparatus having the road condition estimation apparatus for estimating the grip factor or the road coefficient of friction as described above. FIG. 28 shows a setting process of a desired steering angle for each wheel of the vehicle with the steer-by-wire system for controlling each wheel independently. At a steering operation detection unit M41, the state of steering operation (steering wheel operation angle) by a vehicle driver is detected. A steering ratio between a steering wheel operation angle and a steering angle of a wheel is set at a steering ratio setting unit M45, on the basis of the state of steering operation detected at the steering operation detection unit M41, a vehicle speed detected at a vehicle speed detection unit M42, at least one of the grip factor and road coefficient of friction estimated at a grip factor and coefficient of friction estimation unit M43, wherein the grip factor and the road coefficient of friction are estimated in accordance with the process as described before. Accordingly, a desired value of a steering angle for each wheel is determined on the basis of the steering ratio set at the wheel steering ratio setting unit M45 and the steering wheel operation angle detected at the steering operation detection unit M41.

The steering ratio for the front wheel is set at the steering ratio setting unit M45, so as to be large when the vehicle speed is relatively low, and small when the vehicle speed is relatively high. Therefore, convenience in arranging the steering system on the vehicle will be improved, because the steering angle of the front wheel can be obtained with the steering wheel operated by a small amount, when the vehicle speed is low. On the contrary, the vehicle stability will be improved, because the steering angle of the front wheel is made relatively small in response to the operation of the steering wheel, when the vehicle speed is high. In addition, when the speed of operation of the steering wheel is fast (i.e., steering wheel operation angular velocity is large), the steering ratio for each wheel is set to be larger than that in a normal steering operation. Consequently, the vehicle maneuverability will be improved, in such a case that the vehicle is required to be immediately turned to avoid an obstacle on the road. The steering ratio for the front wheel is set on the basis of at least one of the grip factor and the road coefficient of friction. When at least one of the grip factor and the road coefficient of friction is estimated to be relatively low, the steering ratio for each wheel is set to be small. Consequently, when the road coefficient of friction is low, or when the grip factor has become low, the steering angle of the front wheel is set to be relatively low in response to operation of the steering wheel, an excessive steering angle will not be give to each wheel, so that the vehicle stability will be improved.

On the contrary, the desired steering angle of the rear wheel is controlled to set the steering operation in an opposite phase (in the opposite direction to the steering wheel operation) when the vehicle speed is low, and in a common phase (in the same direction to the steering wheel operation) when the vehicle speed is high, on the basis of at least one of the vehicle speed, and at least one of the grip factor and road coefficient of friction. Consequently, the steer ability is improved when the vehicle speed is low, and the vehicle stability is improved when the vehicle speed is high. As the steering ratio of the rear wheels is set appropriately on the basis of the road coefficient of friction or the grip factor, the vehicle stability can be improved further. In the case where the steering wheel is operated fast (i.e., the steering angular velocity is high) in case of an emergency such as presence of obstacles ahead of the vehicle, it is possible to control the steering apparatus to be in an opposite phase for a moment by a so-called phase inversion control, even if the vehicle is running at high speed, to improve the vehicle maneuverability. In the case where the road coefficient of friction is low, or the grip factor is decreased, however, it is preferable to prohibit the phase inversion control, so as to ensure the vehicle stability.

Furthermore, a modified steering angle for making the vehicle behavior stable is added to the steering angle, when setting the desired steering angle in response to operation of the steering wheel by a vehicle driver, so that a final desired steering angle θxxt of each wheel is set at a vehicle stability control unit M48. The modified steering angle is determined by a deviation between a reference vehicle state variable obtained on the basis of the amount of steering wheel operation and the vehicle speed at a reference vehicle model M46, and the actual vehicle state variable calculated by a vehicle state variable calculation unit M47 the result detected by a vehicle behavior detection unit M44, as shown in FIG. 28. As a result, the road coefficient of friction or the grip factor is reflected in the reference vehicle model, to be made more accurate. In addition, when the modified steering angle is determined at the vehicle stability control unit M48, at least one of the road coefficient of friction and the grip factor is used. For example, when the road coefficient of friction is low, or when the grip factor is decreased, the threshold level for initiating the vehicle stability control can be set lower than that in a normal vehicle state, and the amount to be controlled on the basis of the deviation of the vehicle state variable can be set lower.

Figure 32:
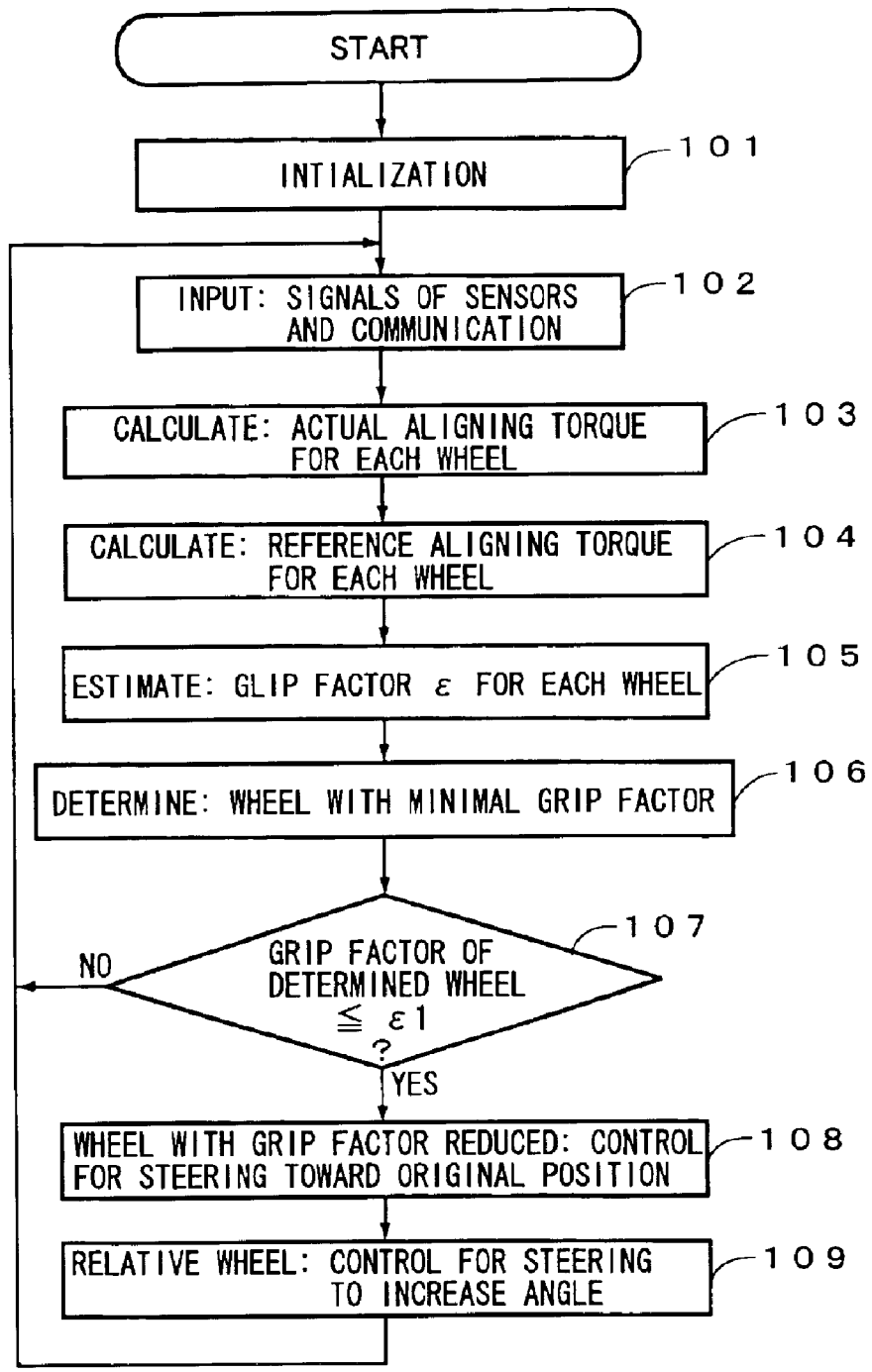
FIG. 32 is a flowchart showing an example of a steering control for improving a vehicle stability on the basis of a relative grip factor of each wheel according to an embodiment of the present invention.

The desired steering angle for each wheel is set as shown in FIG. 28. Also, the steering angle control can be used for improving the vehicle stability according to the relative relationship among the grip factors of the wheels. FIG. 32 is a flowchart showing an example of the steering angle control for improving the vehicle stability on the basis of the relative grip factor of each wheel. At the outset, the program provides for initialization of the system at Step 101, and various sensor signals and communication signals are read at Step 102. Then, the actual aligning torque of each wheel is estimated on the basis of those signals at Step 103, and the reference aligning torque is calculated at Step 104, so that the grip factor ε of each wheel is estimated at Step 105, as explained before in detail. Next, at Step 106, the grip factor of a wheel whose grip factor is minimal, i.e., grip of the wheel has been reduced to its minimal value, is determined. Then, the program proceeds to Step 107 where the grip factor of the wheel is compared with a predetermined value ε1. If the grip factor is determined to be equal to or smaller than the predetermined value ε1, the program proceeds to Step 108 where the steering angle is reduced to restore the grip factor of the wheel. As a result, the side force as a whole will be reduced. Therefore, the steering angle will be increased for a wheel which is placed on a position opposite to the steered wheel laterally in the direction of the vehicle moving forward, at Step 109.

Figure 29:
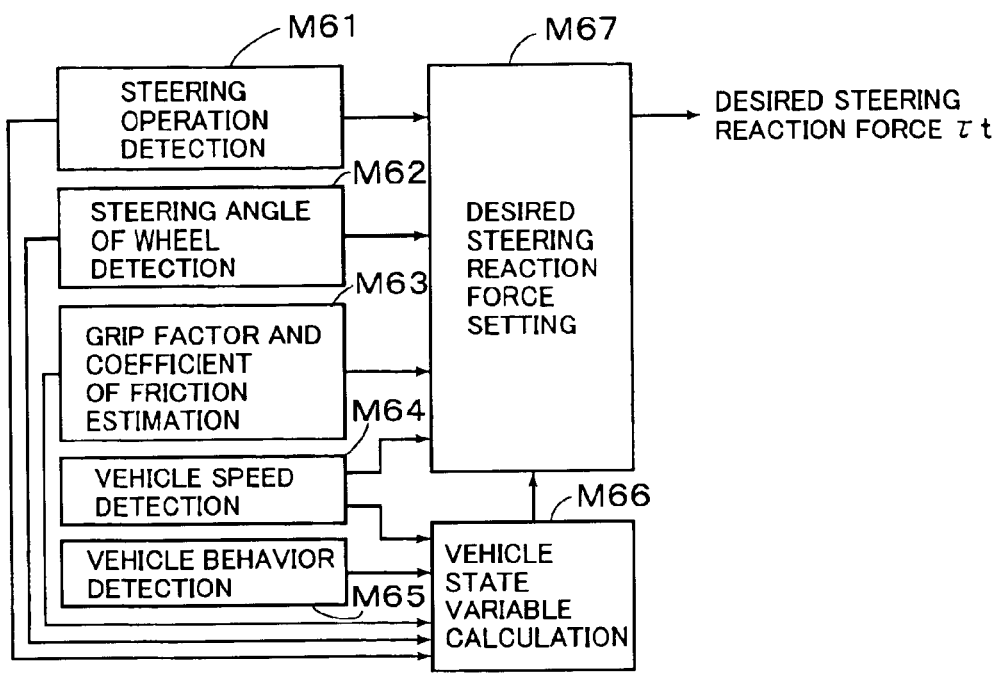
FIG. 29 is a block diagram for setting a desired steering reaction force in a steering reaction force simulator according to an embodiment of the present invention.

FIG. 29 shows a block diagram for setting a desired steering reaction force at the steering reaction force simulator (SST) as shown in FIGS. 3 and 4. It is required for the steering reaction force simulator (SST) to provide the appropriate reaction force, and the information about the reaction force applied to the wheel from the road surface. In order to comply with the requirement, it is so constituted at the desired steering reaction force setting unit M67 that the desired steering reaction force τt is set in accordance with at least one of the amount of operation of the steering wheel, steering angle of the wheel, vehicle speed, vehicle state variable, grip factor, and coefficient of friction, to provide a characteristic of steering reaction in accordance with the amount of operation of the vehicle driver. As shown in FIG. 29, the steering operation detection unit M61, steering angle of wheel detection unit M62, grip factor and coefficient of friction estimation unit M63, vehicle speed detection unit M64, vehicle behavior detection unit M65 and the vehicle state variable calculation unit M66 are provide for detecting, estimating, and calculating the factors in the same manner as described before. And, at the desired steering reaction force setting unit M67, when the vehicle is running at high speed, the desired steering reaction force is set to be increased, so as to improve the vehicle stability. When at least one of the grip factor and the coefficient of friction is decreased, the desired steering reaction force is set to be different from that in the normal condition, e.g., larger or smaller than the normal steering reaction force, and this state is informed to the vehicle driver.

Figure 30:
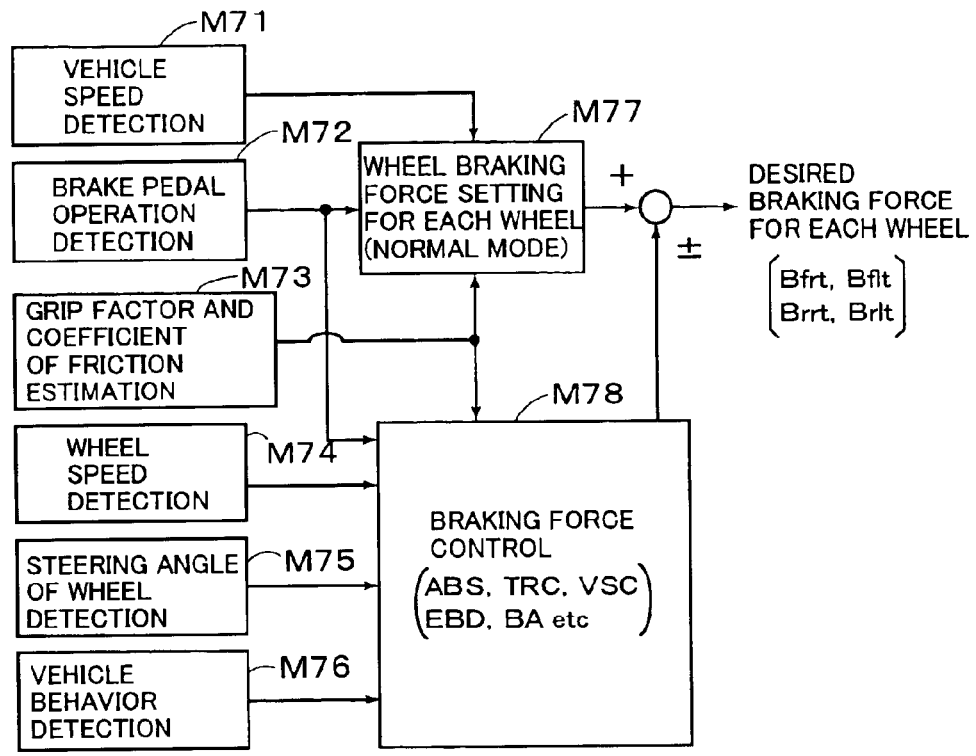
FIG. 30 is a block diagram for setting a desired braking force for each wheel in a vehicle motion control apparatus according to an embodiment of the present invention.

FIG. 30 shows a block diagram for setting a desired braking force for each wheel. At a wheel braking force setting unit M77, on the basis of the amount of braking operation, vehicle speed, and at least one of the grip factor and the road coefficient of friction, desired values (Bfrt, Bflt, Brrt, Brlt) of braking force for each wheel are set for the normal mode (i.e., other than the control modes such as ABS, TRC, EBD, VSC, or BA as described before). Thus, the characteristic of the desired braking force is set in accordance with the amount of operation of the vehicle driver. As shown in FIG. 30, the vehicle speed detection unit M71, brake pedal operation detection unit M72, grip factor and coefficient of friction estimation unit M73, wheel speed detection unit M74, steering angle of wheel detection unit M75 and vehicle behavior detection unit M76 are provide for detecting an estimating the factors in the same manner as described before. And, at a wheel braking force setting unit M77, when the vehicle is running at high speed, the braking force applied to each wheel is set to be larger than that applied to the rear wheels in the braking force distribution control, so as to ensure the vehicle stability. Also, on the basis of at least one of the grip factor and the road coefficient of friction, the desired wheel braking force for each wheel is set as shown in FIG. 31.

Figure 31:
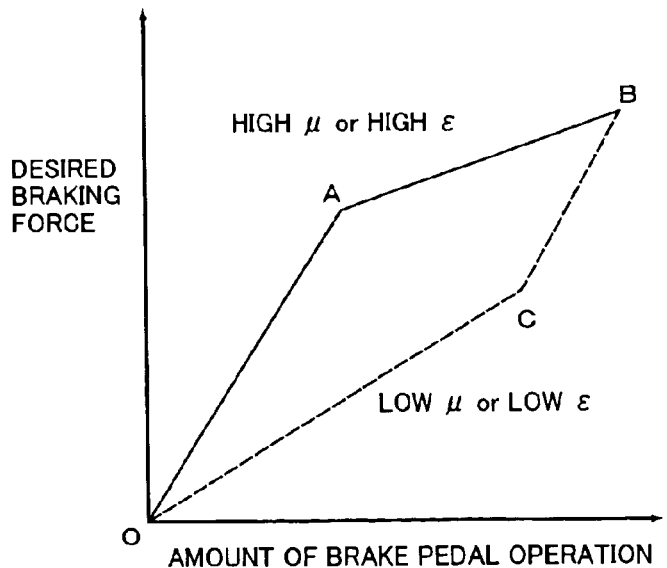
FIG. 31 is a diagram showing a desired braking force for each wheel in a vehicle motion control apparatus according to an embodiment of the present invention.

In the case where the road coefficient of friction or the grip factor is high, it is set as indicated by a solid line O-A-B in FIG. 31. In the case where the amount of operation of the brake pedal is small, i.e., the vehicle deceleration is small, it is set as indicated by a line segment O-A in FIG. 31, to increase the gradient of the desired braking force in response to the amount of operation of the brake pedal. When the amount of operation of the brake pedal has increased to a certain amount, i.e., when the vehicle deceleration has become large, the gradient is set to be small as indicated by a line segment A-B, so that controllability of the vehicle deceleration to the amount of operation will be improved. In the case where the road coefficient of friction or the grip factor is low, the upper limit of the vehicle deceleration to be obtained is limited, so that a dead part will be caused in the operation of the brake pedal. Therefore, the gradient of the desired braking force to the amount of operation of the brake pedal is set to be small, as indicated by a broken line in FIG. 31, so that the controllability of the vehicle deceleration will be improved. In this case, if an error was caused in estimating the road coefficient of friction or the grip factor, the gradient of the desired braking force to the amount of operation of the brake pedal should be set to be large, as indicated by a line segment C-B in FIG. 31, so as to ensure a maximal vehicle speed as a fail safe.

Furthermore, in order to improve the vehicle stability or the vehicle deceleration property, the desired braking force for each wheel is modified at the braking force control unit M78, wherein the braking force control is performed, such as the anti-skid control (ABS), traction control (TRC), vehicle stability control (VSC), braking force distribution control (EBD), brake assist control (BA) and the like, which are generally known. Therefore, it is so constituted that the threshold values for determining to initiate or terminate those controls, or the controlling amount for those controls are determined on the basis of at least one of the grip factor and the road coefficient of friction.

Figure 33:
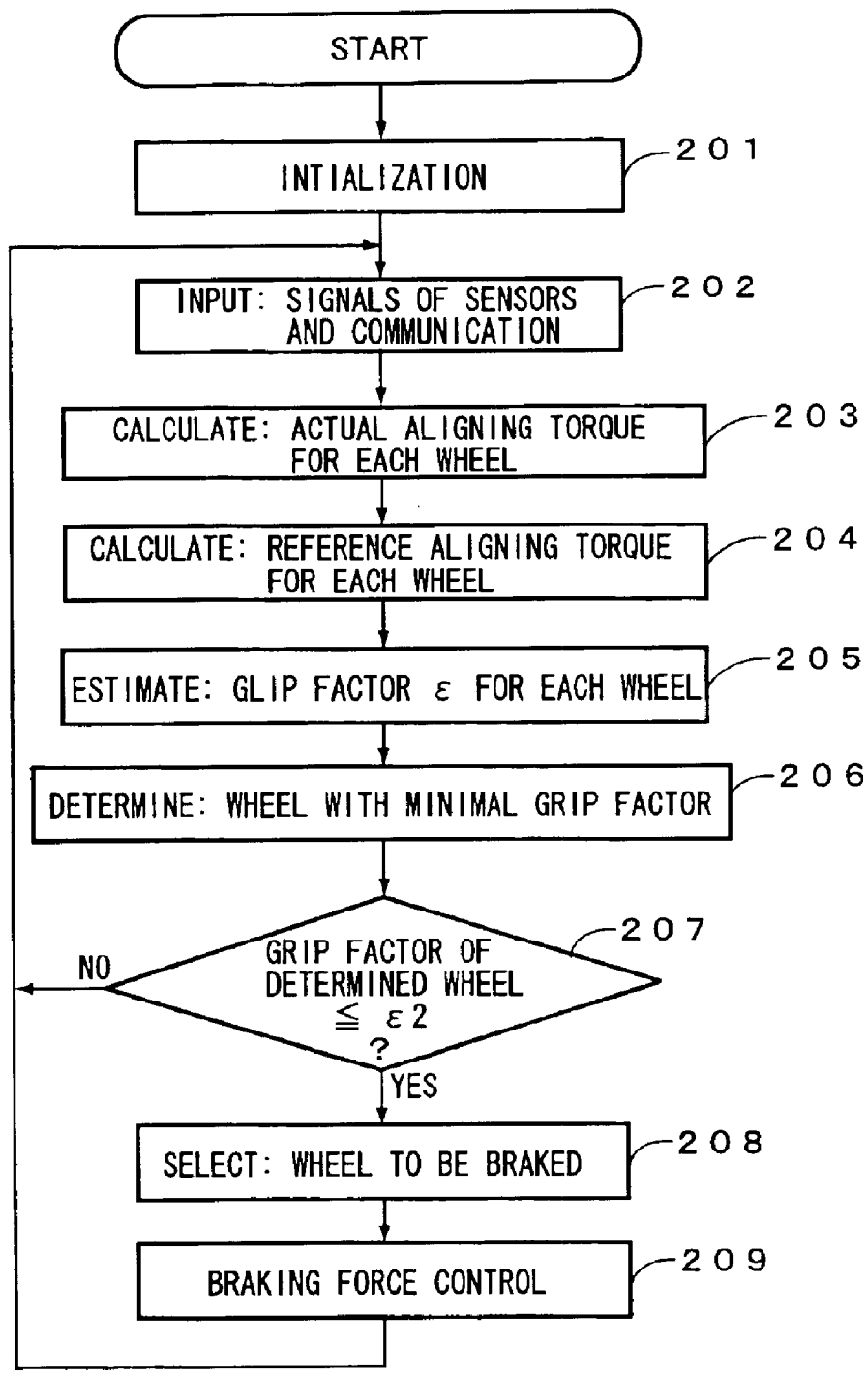
FIG. 33 is a flowchart showing an example of a braking force control for improving a vehicle stability on the basis of a relative grip factor of each wheel according to an embodiment of the present invention.

The desired braking force for each wheel is set as shown in FIG. 30. Also, the braking force control may be performed to improve the vehicle stability according to the relative relationship among the grip factors of the wheels. FIG. 33 is a flowchart showing an example of the braking force control for improving the vehicle stability on the basis of the relative relationship among the grip factors of the wheels. At the outset, the program provides for initialization of the system at Step 201, and various sensor signals and communication signals are read at Step 202. Then, the actual aligning torque of each wheel is calculated on the basis of those signals at Step 203, and the reference aligning torque of each wheel is calculated at Step 204, so that the grip factor of each wheel is estimated at Step 205.

Next, at Step 206, the grip factor of a wheel whose grip factor is minimal, i.e., grip of the wheel has been reduced to its minimal value, is determined. Then, the program proceeds to Step 207 where the grip factor of the wheel is compared with a predetermined value $\epsilon 2$. If the grip factor is determined to be equal to or smaller than the predetermined value $\epsilon 2$, the program proceeds to Step 208 where at least one wheel having a margin of grip factor is selected from the wheels other than the wheel with its grip factor being minimal, and further proceeds to Step 209 where the braking force is applied to the selected wheel. By controlling this braking force, the vehicle speed is reduced to improve the vehicle stability. The wheel with its braking force to be controlled is selected not only on the basis of the determination based on the grip factor, but also not to cause any unnecessary yaw moment to the wheel with the braking force applied thereto, and the control amount (i.e., the braking force to be applied) is determined.

Figure 34:
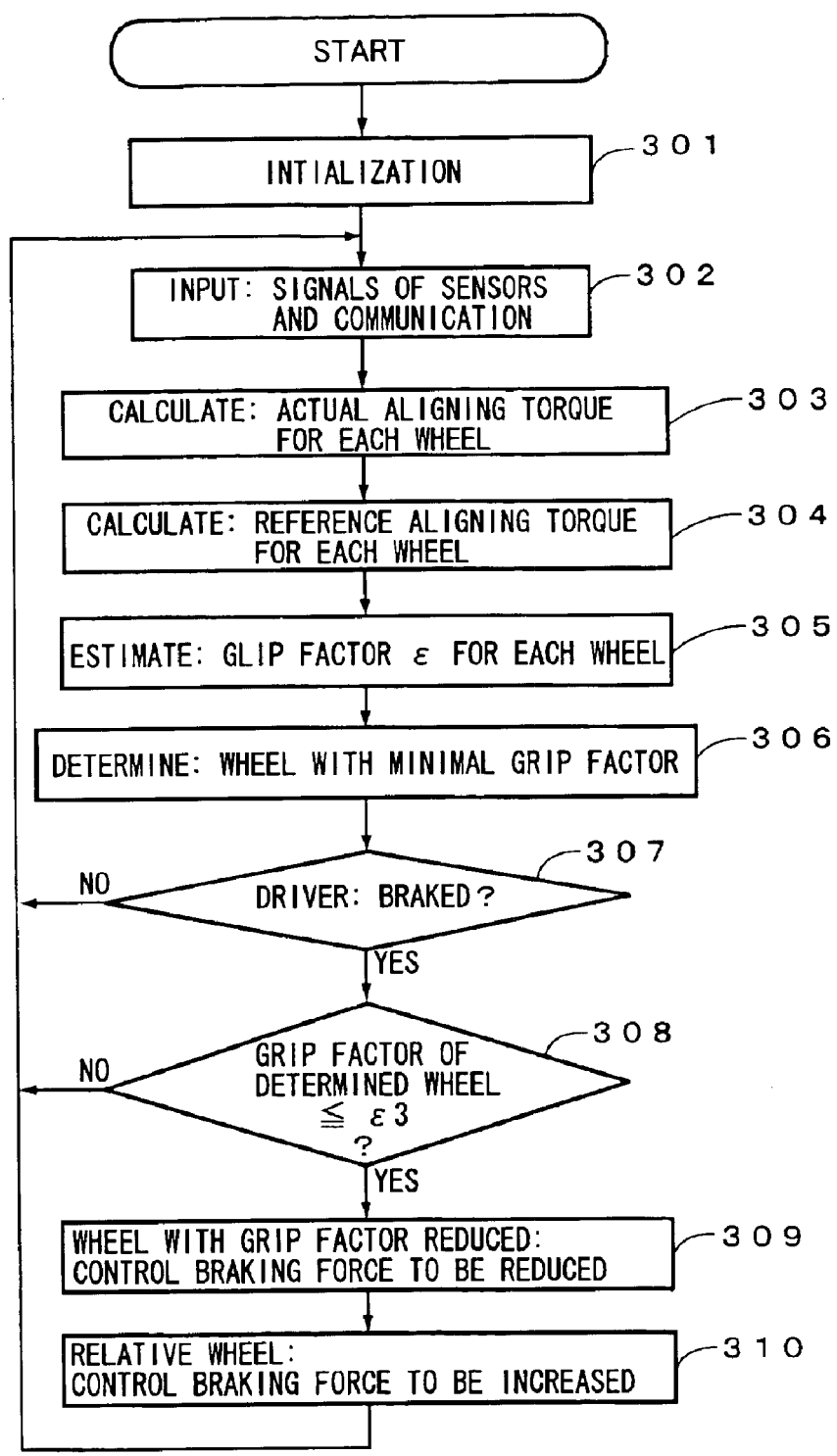
FIG. 34 is a flowchart showing an example of a braking force control on the basis of a relative grip factor of each wheel according to an embodiment of the present invention.

FIG. 34 shows an example of the braking force control performed on the basis of the relative grip factor, wherein Steps 301–306 are the same as Steps 201–206 in FIG. 33, so that the explanation of them are omitted. After the wheel with its grip factor being minimal is determined at Step 306, the program proceeds to Step 307 where it is determined if the vehicle driver has operated the brake pedal BP. When it is determined that the driver has operated it, the program further proceeds to Step 308 where the grip factor is compared with a predetermined value $\epsilon 3$. If the grip factor is determined to be equal to or smaller than the predetermined value $\epsilon 3$, the program proceeds to Step 309, where the braking force applied to the wheel is controlled to be reduced, so as to restore the grip factor of the wheel with the reduced grip factor. Also, the braking force applied to a wheel relative to the wheel is controlled to be increased at Step 310. In this case, however, the braking force as a whole is reduced, so that the vehicle deceleration will be reduced, against the amount of braking operation of the vehicle driver. According to the present embodiment, therefore, the wheel to be applied with the braking force control is selected and the braking force is controlled, on the basis of the grip factor, so as to prevent unnecessary yaw moment from being produced by the applied braking force.

Figure 35:
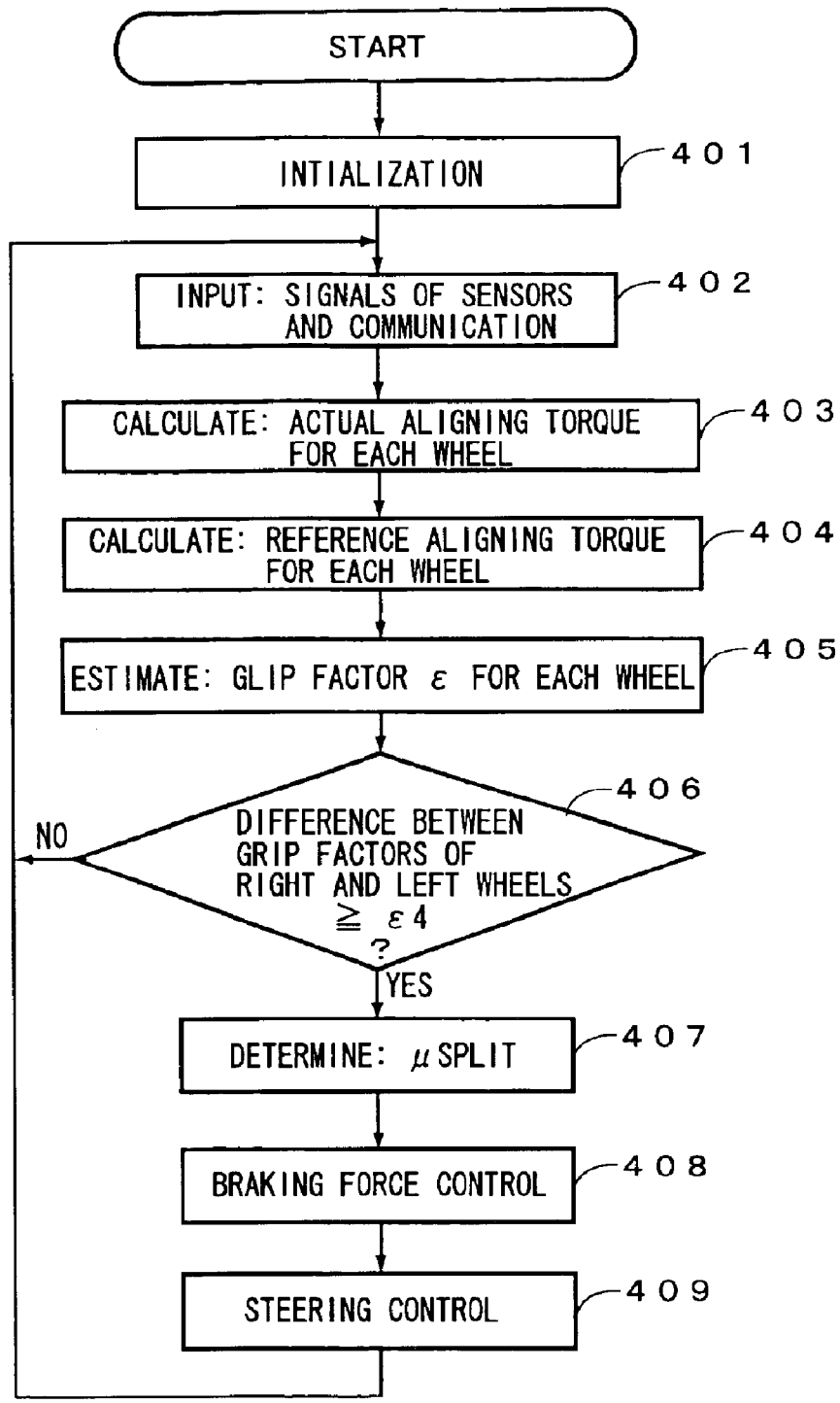
FIG. 35 is a flowchart showing a routine for determining a $\mu$-split road on the basis of a grip factor according to an embodiment of the present invention.

Furthermore, by comparing the grip factors of right and left wheels, it is possible to determine a so-called $\mu$-split road, which has at least two parallel lanes with different coefficients of friction. FIG. 35 is a flowchart showing the determination of the $\mu$-split road on the basis of the grip factor. Steps 401–405 are the same as Steps 201–205 in FIG. 33, so that the explanation of them are omitted. On the basis of the grip factor of each wheel estimated at Step 405, the difference between the grip factors of right and left wheels is compared with a predetermined value $\epsilon 4$. If it is determined to be equal to or greater than the predetermined value $\epsilon 4$, the program proceeds to Step 407 where it is determined that the vehicle is running on the $\mu$-split road. In this respect, it can be determined whether the difference of grip factor between the right and left wheels is resulted from the $\mu$-split road or the load variation, because the influence of the load variation has been compensated according to the estimation of the grip factor of each wheel as described above. The information on the $\mu$-split determined at Step 407 is used for the braking control at Step 408, and also for the steering control at Step 409. In the braking force control, for example, the desired braking force is provided for enabling the braking force applied to the road with higher coefficient of friction to be used effectively. In the steering control, the steering angle is provided for preventing the unnecessary yaw moment caused by the difference of braking force between the right and left wheels. The difference of grip factor between the right and left wheels determined at Step 406 includes the difference between the right and left front wheels, the difference between the right and left rear wheels, and the difference between the average of front and rear right wheels and the average of front and rear left wheels.

Furthermore, although a flowchart is omitted herein, the warning system ALM may be so constituted that if at least one of the estimated grip factor and the road coefficient of friction is decreased to be less than each predetermined threshold level, a warning information is given to the vehicle driver by means of a warning apparatus (as shown in FIG. 4) through sound, voice, light, vibration or the like. Furthermore, when the estimated grip factor is reduced to be less than a predetermined value, for example, it may be so constituted that the engine output shall be reduced, or the braking effect through engine brake shall be increased by a shift down, to brake the vehicle automatically, so that the vehicle speed will be reduced.

With respect to the embodiments with such systems as constituted to estimate the grip factor of each wheel independently and individually, they can be listed on a table as shown in FIG. 38. The embodiments as described before correspond to the embodiment (a) and (b) in FIG. 38, respectively, wherein the aligning torque is estimated by the output of the steering actuator, and the wheel factor is estimated by the vehicle state variable. Instead of those estimated values, they may be detected by various sensors as listed on the table in FIG. 38.

Figure 36:
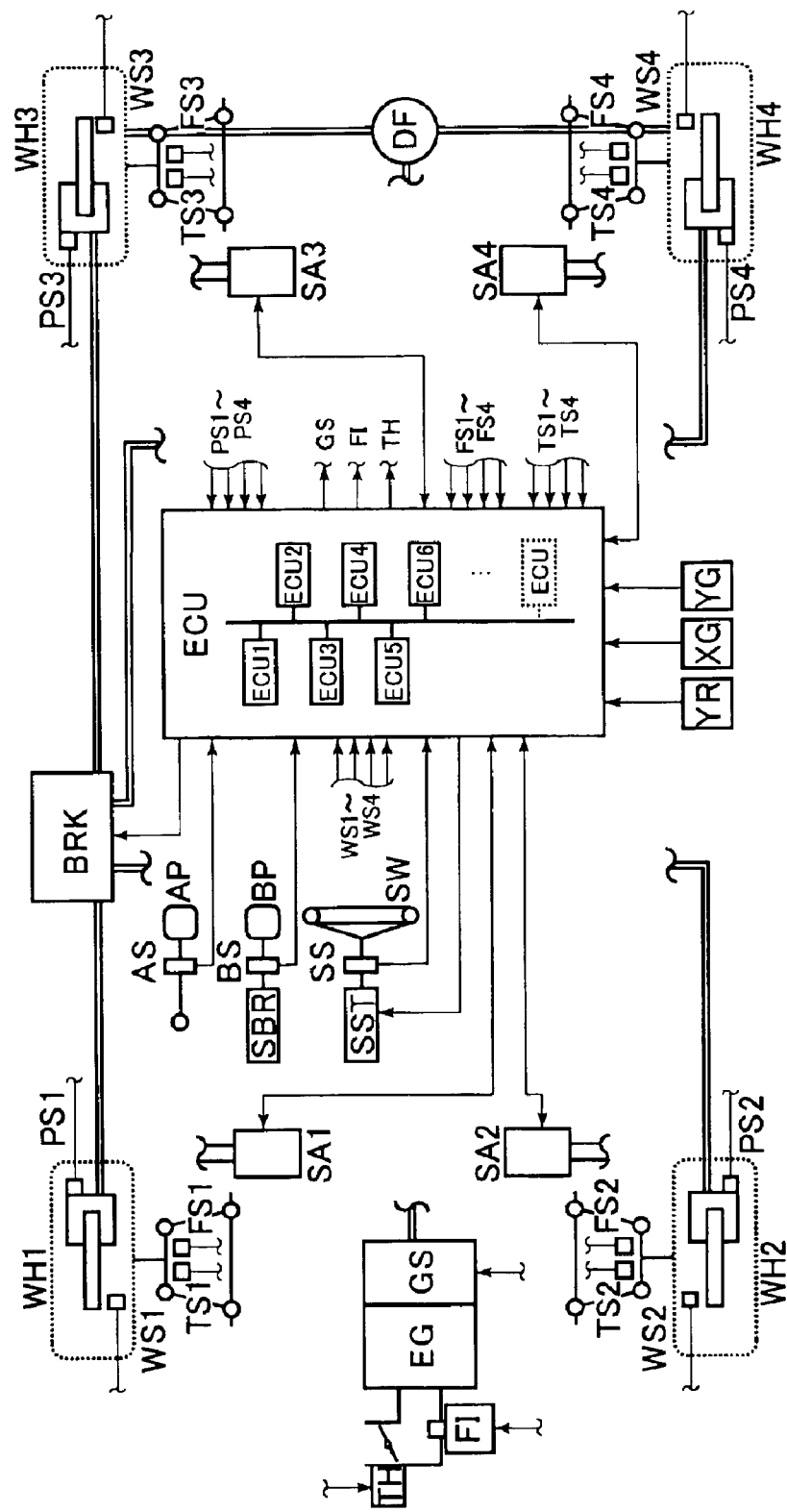
FIG. 36 is a block diagram showing an embodiment of a road condition estimation apparatus of the present invention, provided for a vehicle having toque sensors and side force sensors.
Figure 37:
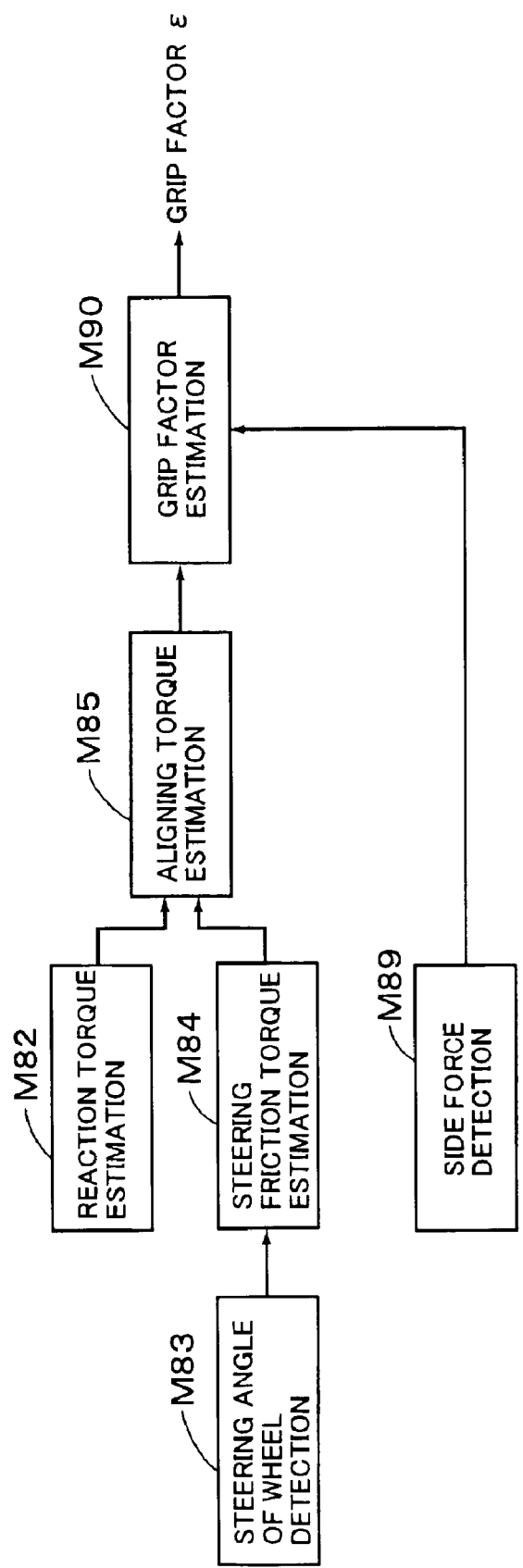
FIG. 37 is a block diagram showing an embodiment of a grip factor estimation apparatus provided for a vehicle as shown in FIG. 36.

FIG. 36 shows an embodiment which corresponds to the embodiment (c) on the table in FIG. 38, and which relates a system having torque sensors TS1–TS4 and side force sensors FS1–FS4. As shown in FIG. 36, the torque sensors TS1–TS4 are operatively mounted on kingpins, respectively, so as to detect the torque directly, and the side force sensors FS1–FS4 are operatively mounted on suspension members, respectively, so as to detect the side force directly. The grip factor estimation apparatus for use in this system is constituted as shown in FIG. 37. Referring to FIGS. 36 and 37, the reaction force is directly detected by the torque sensors TS1–TS4 which serve as a reaction force detection unit M82. Then, the friction component of the members in the steering system, which is estimated at a steering friction torque estimation unit M84 on the basis of the result detected by a steering angle of wheel detection unit M83, is removed from the reaction force, to estimate the aligning torque at an aligning torque estimation unit M85. Then, the estimated aligning torque is compared with the side force directly detected by the side force sensors FS1–FS4 which serve as a side force detection unit M89, at a grip factor estimation unit M90, wherein the grip factor ϵ is estimated, in the same manner as shown in FIG. 8.

The embodiment (d) in FIG. 38 is the one with the wheel slip angle substituted for the wheel factor of the embodiment (c) as described above. In this case, in order to detect the wheel slip angle directly, employed is a speed sensor for detecting a speed in its longitudinal direction (Vx) and a speed in its lateral direction (Vy) optically, to obtain the wheel slip angle as $\tan^{-1}$ (Vy/Vx).

In each of the embodiments as described above, it is so constituted that the steering angle of each wheel (4 wheels in total) of the vehicle is controlled individually. As the front wheels contribute a lot to the steering operation of the vehicle, the steering operation of the rear wheels may be omitted, if necessary.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. An apparatus for estimating a road condition for use in a vehicle having steering control means for actuating a device mechanically independent of a manually operated steering member to steer each wheel, comprising:

reaction torque detection means for detecting a reaction torque when at least a wheel of said vehicle is steered by said steering control means;

aligning torque estimation means for estimating an aligning torque produced on said wheel on the basis of the reaction torque detected by said reaction torque detection means;

wheel factor providing means for providing at least one of wheel factors including a side force and a slip angle applied to said wheel; and grip factor estimation means for estimating a grip factor of at least a tire of said wheel, which grip factor indicates a grip level of the tire in a lateral direction to wheel, in accordance with a relationship between the aligning torque estimated by said aligning torque estimation means and the wheel factor provided by said wheel factor providing means.

2. An apparatus for estimating a road condition as set forth in claim 1, further comprising;

reference aligning torque setting means for setting a reference aligning torque on the basis of the wheel factor provided by said wheel factor providing means and the aligning torque estimated by said aligning torque estimation means, wherein said grip factor estimation means estimates the grip factor of said tire on the basis of a result of comparison between the aligning torque estimated by said aligning torque estimation means and the reference aligning torque set by said reference aligning torque setting means.

3. An apparatus for estimating a road condition as set forth in claim 2, wherein said reference aligning torque setting means sets the reference aligning torque by approximating a characteristic of the aligning torque estimated by said aligning torque estimation means against the wheel factor provided by said wheel factor providing means to a linear characteristic of the reference aligning torque including at least the origin, and sets the reference aligning torque on the basis of the linear characteristic of the reference aligning torque.

4. An apparatus for estimating a road condition as set forth in claim 2, wherein said reference aligning torque setting means sets a linear characteristic of the reference aligning torque with a gradient which is provided by a brush model of said wheel, and sets the reference aligning torque on the basis of the linear characteristic of the reference aligning torque.

5. An apparatus for estimating a road condition as set forth in claim 1, further comprising;

friction estimation means for estimating a coefficient of friction of a road on which said vehicle is running, on the basis of the grip factor estimated by said grip factor estimation means.

6. An apparatus for estimating a road condition as set forth in claim 5, further comprising;

warning means for warning to a vehicle driver when at least one of road factors including the grip factor estimated by said grip factor estimation means and the coefficient of friction estimated by said friction estimation means is less than a predetermined value.

7. An apparatus for estimating a road condition as set forth in claim 5, further comprising;

road surface determination means for determining whether said vehicle is running on a split road with at least two parallel lanes having different coefficients of friction, on the basis of the result of comparison between at least one of road factors including the grip factor estimated by said grip factor estimation means and the coefficient of friction estimated by said friction estimation means with respect to a right wheel of said vehicle, and at least one of said road factors with respect to a left wheel of said vehicle.

8. A vehicle motion control apparatus provided with an apparatus for estimating a road condition for use in a vehicle having steering control means for actuating a device mechanically independent of a manually operated steering member to steer each wheel, comprising:

reaction torque detection means for detecting a reaction torque when at least a wheel of said vehicle is steered by said steering control means;

aligning torque estimation means for estimating an aligning torque produced on said wheel on the basis of the reaction torque detected by said reaction torque detection means;

wheel factor providing means for providing at least one of wheel factors including a side force and a slip angle applied to said wheel; and grip factor estimation means for estimating a grip factor of at least a tire of said wheel, which grip factor indicates a grip level of the tire in a lateral direction to the wheel, in accordance with a relationship between the aligning torque estimated by said aligning torque estimation means and the wheel factor provided by said wheel factor providing means, wherein said steering control means steers said wheel to provide a steering angle thereof on the basis of the grip factor estimated by said grip factor estimation means.

9. A vehicle motion control apparatus as set forth in claim 8, further comprising;

friction estimation means for estimating a coefficient of friction of a road on which said vehicle is running, on the basis of the grip factor estimated by said grip factor estimation means, wherein said steering control means steers said wheel to provide said steering angle thereof on the basis of at least one of road factors including the grip factor estimated by said grip factor estimation means and the coefficient of friction estimated by said friction estimation means.

10. A vehicle motion control apparatus as set forth in claim 8, wherein said steering control means steers one wheel of said vehicle with the grip factor reduced to be less than a predetermined value, to reduce the steering angle of said one wheel.

11. A vehicle motion control apparatus as set forth in claim 10, wherein said steering control means steers the other one wheel of said vehicle placed on a position opposite to said one wheel in a lateral direction of said vehicle, to increase the steering angle of the other one wheel.

12. A vehicle motion control apparatus as set forth in claim 8, further comprising;

braking force control means for controlling a braking force applied to each wheel of said vehicle, said braking force control means setting said braking force on the basis of the grip factor estimated by said grip factor estimation means.

13. A vehicle motion control apparatus as set forth in claim 12, wherein when the grip factor of one wheel of said vehicle estimated by said grip factor estimation means is reduced to be less than a predetermined value, said braking force control means applies the braking force to wheels of said vehicle other than said one wheel.

14. A vehicle motion control apparatus as set forth in claim 12, wherein when the grip factor of one wheel of said vehicle estimated by said grip factor estimation means is reduced to be less than a predetermined value during the braking operation of said vehicle, said braking force control means reduces the braking force applied to said one wheel.

15. A vehicle motion control apparatus as set forth in claim 14, wherein when said braking force control means reduces the braking force applied to said one wheel, said braking force control means increases the braking force applied to at least one of the wheels of said vehicle other than said one wheel.

16. A vehicle motion control apparatus as set forth in claim 8, further comprising;

reference aligning torque setting means for setting a reference aligning torque on the basis of the wheel factor provided by said wheel factor providing means and the aligning torque estimated by said aligning torque estimation means, wherein said grip factor estimation means estimates the grip factor of said tire on the basis of a result of comparison between the aligning torque estimated by said aligning torque estimation means and the reference aligning torque set by said reference aligning torque setting means.

17. A vehicle motion control apparatus as set forth in claim 16, wherein said reference aligning torque setting means sets the reference aligning torque by approximating a characteristic of the aligning torque estimated by said aligning torque estimation means against the wheel factor provided by said wheel factor providing means to a linear characteristic of the reference aligning torque including at least the origin, and sets the reference aligning torque on the basis of the linear characteristic of the reference aligning torque.

18. A vehicle motion control apparatus as set forth in claim 17, wherein said reference aligning torque setting means sets a linear characteristic of the reference aligning torque with a gradient which is provided by a brush model of said wheel, and sets the reference aligning torque on the basis of the linear characteristic of the reference aligning torque.

* * * * *